United States Patent
Chiang et al.

(10) Patent No.: US 11,616,966 B2
(45) Date of Patent: Mar. 28, 2023

(54) INTERACTION BETWEEN CORE TRANSFORM AND SECONDARY TRANSFORM

(71) Applicant: MediaTek Inc., Hsinchu (TW)

(72) Inventors: Man-Shu Chiang, Hsinchu (TW); Chih-Wei Hsu, Hsinchu (TW)

(73) Assignee: MediaTek Inc.

( * ) Notice: Subject to any disclaimer, the term of this patent is extended or adjusted under 35 U.S.C. 154(b) by 0 days.

(21) Appl. No.: 16/836,904

(22) Filed: Mar. 31, 2020

(65) Prior Publication Data

US 2020/0322623 A1 Oct. 8, 2020

Related U.S. Application Data

(60) Provisional application No. 62/828,567, filed on Apr. 3, 2019.

(51) Int. Cl.
*H04N 19/46* (2014.01)
*H04N 19/105* (2014.01)
(Continued)

(52) U.S. Cl.
CPC .......... *H04N 19/46* (2014.11); *H04N 19/105* (2014.11); *H04N 19/119* (2014.11);
(Continued)

(58) Field of Classification Search
CPC .... H04N 19/176; H04N 19/159; H04N 19/12; H04N 19/122; H04N 19/157
See application file for complete search history.

(56) References Cited

U.S. PATENT DOCUMENTS 10,419,754 B1 * 9/2019 Zhao ............... H04N 19/184
10,742,972 B1 * 8/2020 Li ..................... H04N 19/70
(Continued)

FOREIGN PATENT DOCUMENTS

| CN | 103024389 A | 4/2013 | |
| CN | 103561263 A | 2/2014 | |
| WO | WO-2018080122 A1 * | 5/2018 | ........... H04N 19/186 |

OTHER PUBLICATIONS

Pfaff et al., CE3: Affine linear weighted intra prediction (CE3-4.1, CE3-4.2), JVET, 14 Meeting: Geneva, CH, Mar. 19-27, 2019, JVET-N0217 (Year: 2019).*

(Continued)

*Primary Examiner* — Daniel Chang
(74) *Attorney, Agent, or Firm* — Han IP PLLC; Andy M. Han

(57) ABSTRACT

A video decoder receives data from a bitstream for a block of pixels to be decoded as a current block of a current picture of a video. The video decoder receives from the bitstream first and second signaled indices for the current block. The video decoder determines first and second merge indices from the first and second signaled indices. The video decoder uses the first and second merge indices to select first and second motion candidates, respectively. The video decoder generates a set of prediction samples in ALWIP mode and performs an inverse secondary transform and an inverse primary transform to generate a set of residual samples of the current block. Enabling or selection of secondary transform and/or primary transform depends on size, width, and/or height for the current block. The video decoder reconstructs the current block by using the set of residual samples and the set of prediction samples.

19 Claims, 15 Drawing Sheets

| Merge_index | L0 | L1 |
|---|---|---|
| 0 | mvL0_A, ref0 | - |
| 1 | - | mvL1_A, ref1 |
| 2 | | |
| 3 | | |
| 4 | | |

| Merge_index | L0 | L1 |
|---|---|---|
| 0 | mvL0_A, ref0 | - |
| 1 | - | mvL1_A, ref1 |
| 2 | mvL0_A, ref0→ | mvL0'_A, ref0' |
| 3 | mvL1'_A, ref1← | mvL1_A, ref1 |
| 4 | | |

(51) Int. Cl.
*H04N 19/119* (2014.01)
*H04N 19/176* (2014.01)
*H04N 19/625* (2014.01)
*H04N 19/159* (2014.01)
*H04N 19/132* (2014.01)

(52) U.S. Cl.
CPC ......... *H04N 19/132* (2014.11); *H04N 19/159* (2014.11); *H04N 19/176* (2014.11); *H04N 19/625* (2014.11)

(56) References Cited

U.S. PATENT DOCUMENTS

| | | | | |
|---|---|---|---|---|
| 2011/0090952 | A1* | 4/2011 | Cohen | H04N 19/60 |
| | | | | 375/240.2 |
| 2012/0140821 | A1* | 6/2012 | Drugeon | H04N 19/182 |
| | | | | 375/E7.243 |
| 2013/0251039 | A1* | 9/2013 | Drugeon | H04N 19/11 |
| | | | | 375/240.14 |
| 2017/0094313 | A1 | 3/2017 | Zhao et al. | |
| 2017/0094314 | A1* | 3/2017 | Zhao | H04N 19/159 |
| 2017/0310990 | A1* | 10/2017 | Hsu | H04N 19/577 |
| 2018/0176582 | A1* | 6/2018 | Zhao | H04N 19/619 |
| 2018/0352247 | A1 | 12/2018 | Park et al. | |
| 2018/0367814 | A1* | 12/2018 | Seregin | H04N 19/70 |
| 2019/0007682 | A1* | 1/2019 | Kanoh | H04N 19/12 |
| 2019/0104322 | A1* | 4/2019 | Tsukuba | H04N 19/124 |
| 2019/0149823 | A1* | 5/2019 | Lim | H04N 19/70 |
| | | | | 375/240.03 |
| 2019/0208203 | A1* | 7/2019 | Tsukuba | H04N 19/46 |
| 2019/0238841 | A1* | 8/2019 | Lee | H04N 19/11 |
| 2019/0246102 | A1* | 8/2019 | Cho | H04N 19/109 |
| 2019/0246103 | A1* | 8/2019 | Jun | H04N 19/86 |
| 2019/0268594 | A1* | 8/2019 | Lim | H04N 19/117 |
| 2019/0281290 | A1* | 9/2019 | Lee | H04N 19/463 |
| 2019/0281321 | A1* | 9/2019 | Zhao | H04N 19/61 |
| 2019/0306526 | A1* | 10/2019 | Cho | G06N 20/00 |
| 2019/0313102 | A1* | 10/2019 | Cho | H04N 19/132 |
| 2019/0335172 | A1* | 10/2019 | Zhao | H04N 19/44 |
| 2019/0387241 | A1* | 12/2019 | Kim | H04N 19/176 |
| 2020/0014919 | A1* | 1/2020 | Zhao | H04N 19/593 |
| 2020/0014920 | A1* | 1/2020 | Zhao | H04N 19/176 |
| 2020/0014924 | A1* | 1/2020 | Zhao | H04N 19/46 |
| 2020/0021804 | A1* | 1/2020 | Jun | H04N 19/176 |
| 2020/0021805 | A1* | 1/2020 | Ko | H04N 19/46 |
| 2020/0021828 | A1* | 1/2020 | Cho | H04N 19/44 |
| 2020/0029071 | A1* | 1/2020 | Kang | H04N 19/105 |
| 2020/0029077 | A1* | 1/2020 | Lee | H04N 19/11 |
| 2020/0053359 | A1* | 2/2020 | Lee | H04N 19/176 |
| 2020/0059642 | A1* | 2/2020 | Kang | H04N 19/182 |
| 2020/0084441 | A1* | 3/2020 | Lee | H04N 19/105 |
| 2020/0128266 | A1* | 4/2020 | Xu | H04N 19/52 |
| 2020/0162729 | A1* | 5/2020 | Lee | H04N 19/48 |
| 2020/0186799 | A1* | 6/2020 | Wang | H04N 19/52 |
| 2020/0195948 | A1* | 6/2020 | Li | H04N 19/44 |
| 2020/0195973 | A1* | 6/2020 | Xu | H04N 19/70 |
| 2020/0213622 | A1* | 7/2020 | Xu | H04N 19/176 |
| 2020/0267406 | A1* | 8/2020 | Chang | H04N 19/513 |
| 2020/0322623 | A1* | 10/2020 | Chiang | H04N 19/46 |
| 2020/0389666 | A1* | 12/2020 | Zhao | H04N 19/70 |
| 2021/0014534 | A1* | 1/2021 | Koo | H04N 19/157 |
| 2021/0084290 | A1* | 3/2021 | Cho | H04N 19/176 |
| 2021/0120261 | A1* | 4/2021 | Lim | H04N 19/176 |
| 2021/0203969 | A1* | 7/2021 | Salehifar | H04N 19/159 |
| 2021/0218955 | A1* | 7/2021 | Lee | H04N 19/137 |
| 2021/0235119 | A1* | 7/2021 | Kim | H04N 19/12 |
| 2021/0368172 | A1* | 11/2021 | Lim | H04N 19/119 |

OTHER PUBLICATIONS

Koo et al. CE6: Reduced Secondary Transform (RST) (CE6-3.1), JVET, 14th Meeting: Geneva, CH, Mar. 19-27, 2019, JVET-N0193 (Year: 2019).*

China National Intellectual Property Administration, International Search Report and Written Opinion for PCT/CN2020/083090, dated Jul. 2, 2020.

Taiwan Intellectual Property Office, Office Action for Taiwan Patent Application No. 109111224, dated May 21, 2021.

LG Electronics Inc., CE6: Reduced Secondary Transform (RST) (CE6-3.1), Joint Video Experts Team (JVET) of ITU-T SG 16 WP 3 and ISO/IEC JTC 1/SC 29/WG 11, JVET-N0193, 14th Meeting, Geneva, Switzerland, Mar. 19-27, 2019.

Fraunhofer HHI, CE3: Affine linear weighted intra prediction (CE3-4.1, CE3-4.2), Joint Video Experts Team (JVET) of ITU-T SG 16 WP 3 and ISO/IEC JTC 1/SC 29/WG 11, JVET-N0217, 14th Meeting, Geneva, Switzerland, Mar. 19-27, 2019.

* cited by examiner

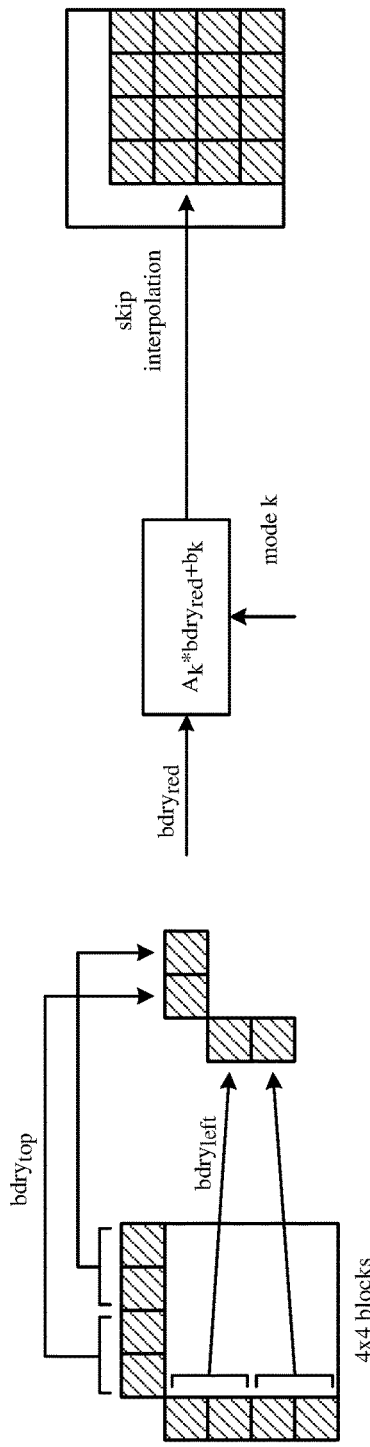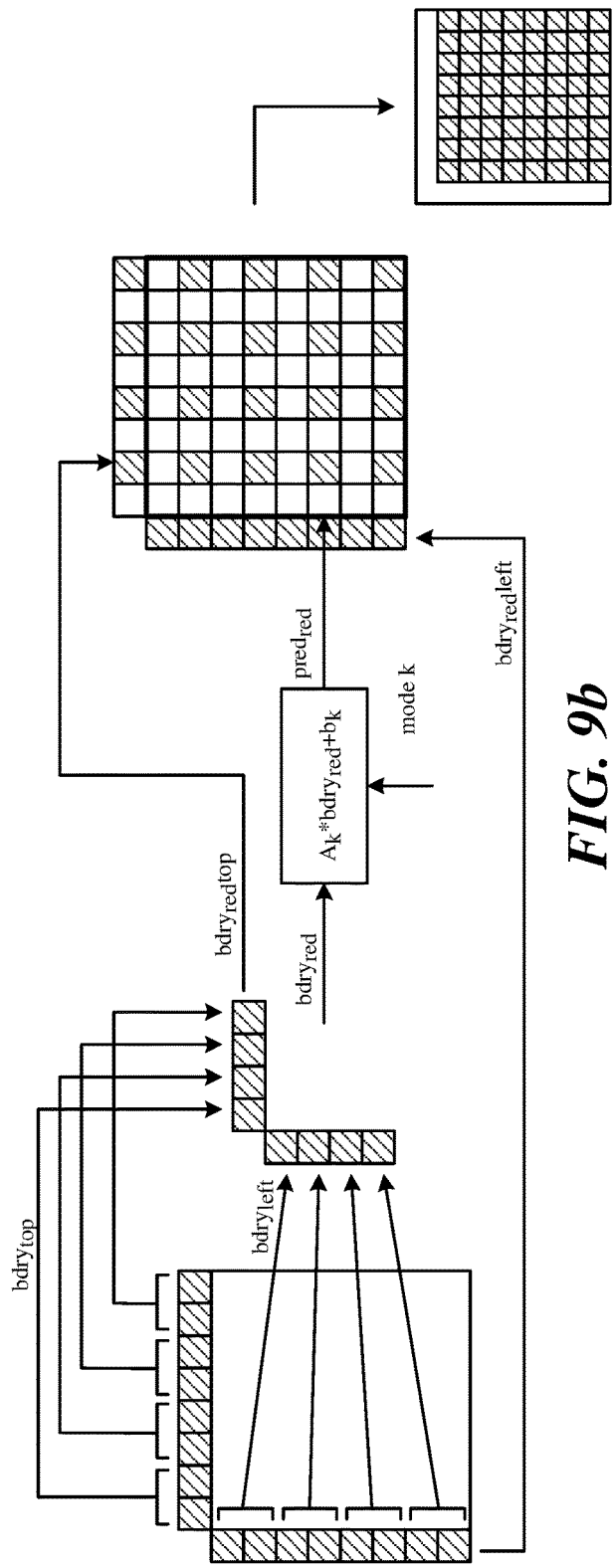
FIG. 9a
FIG. 9b

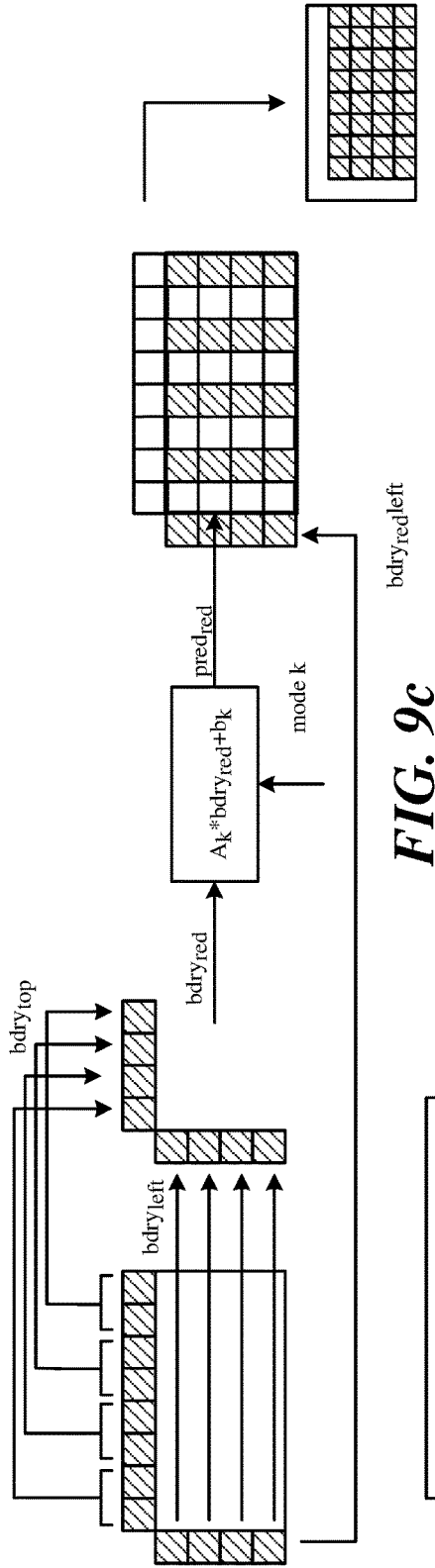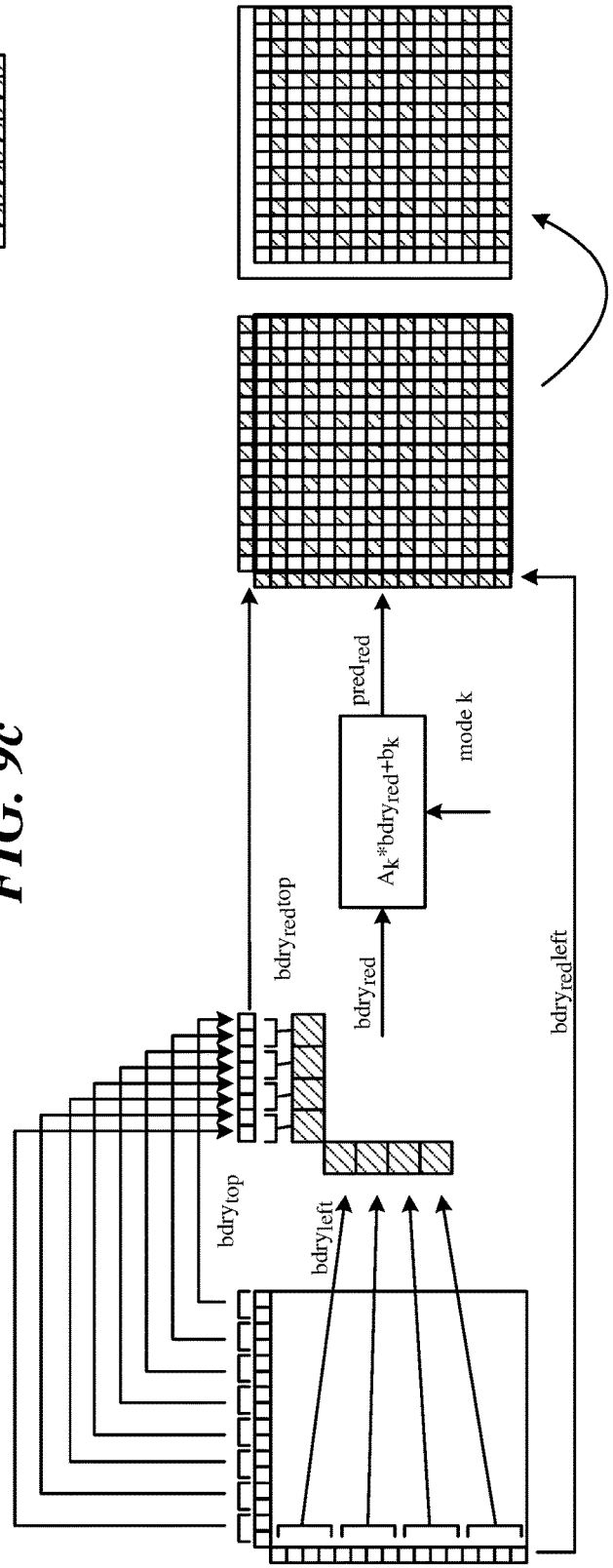
FIG. 9c
FIG. 9d

| $r_{00}$ | $r_{10}$ | $r_{20}$ | $r_{30}$ |
|---|---|---|---|
| $r_{01}$ | $r_{11}$ | $r_{21}$ | $r_{31}$ |
| $r_{02}$ | $r_{12}$ | $r_{22}$ | $r_{32}$ |
| $r_{03}$ | $r_{13}$ | $r_{23}$ | $r_{33}$ |

$$cost1 = \sum_{x=0}^{w-1} |r_{x0}| + \sum_{y=1}^{h-1} |r_{0y}|$$

$$cost2 = \sum_{x=1}^{w-2} \sum_{y=1}^{h-2} |r_{xy}|$$

$$cost3 = \sum_{x=w/2}^{w-1} \sum_{y=h/2}^{h-1} |r_{xy}|$$

*FIG. 11*

INTERACTION BETWEEN CORE TRANSFORM AND SECONDARY TRANSFORM

CROSS REFERENCE TO RELATED PATENT APPLICATION(S)

The present disclosure is part of a non-provisional application that claims the priority benefit of U.S. Provisional Patent Application No. 62/828,567, filed on 3 Apr. 2019. Content of above-listed application is herein incorporated by reference.

TECHNICAL FIELD

The present disclosure relates generally to video coding. In particular, the present disclosure relates to signaling selection of transform and prediction operations.

BACKGROUND

Unless otherwise indicated herein, approaches described in this section are not prior art to the claims listed below and are not admitted as prior art by inclusion in this section.

High-Efficiency Video Coding (HEVC) is an international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block of pixels, and each CU can be recursively split into four smaller CUs until the predefined minimum size is reached. Each CU contains one or multiple prediction units (PUs).

To achieve the best coding efficiency of hybrid coding architecture in HEVC, there are two kinds of prediction modes for each PU, which are intra prediction and inter prediction. For intra prediction modes, the spatial neighboring reconstructed pixels can be used to generate the directional predictions. There are up to 35 directions in HEVC. For inter prediction modes, the temporal reconstructed reference frames can be used to generate motion compensated predictions. There are three different modes, including Skip, Merge and Inter Advanced Motion Vector Prediction (AMVP) modes.

When a PU is coded in Inter AMVP mode, motion-compensated prediction is performed with transmitted motion vector differences (MVDs) that can be used together with Motion Vector Predictors (MVPs) for deriving motion vectors (MVs). To decide MVP in Inter AMVP mode, the advanced motion vector prediction (AMVP) scheme is used to select a motion vector predictor among an AMVP candidate set including two spatial MVPs and one temporal MVP. So, in AMVP mode, MVP index for MVP and the corresponding MVDs are required to be encoded and transmitted. In addition, the inter prediction direction to specify the prediction directions among bi-prediction, and uni-prediction which are list 0 (L0) and list 1 (L1), accompanied with the reference frame index for each list should also be encoded and transmitted.

When a PU is coded in either Skip or Merge mode, no motion information is transmitted except the Merge index of the selected candidate. That is because the Skip and Merge modes utilize motion inference methods (MV=MVP+MVD where MVD is zero) to obtain the motion information from spatially neighboring blocks (spatial candidates) or a temporal block (temporal candidate) located in a co-located picture where the co-located picture is the first reference picture in list 0 or list 1, which is signaled in the slice header. In the case of a Skip PU, the residual signal is also omitted. To determine the Merge index for the Skip and Merge modes, the Merge scheme is used to select a motion vector predictor among a Merge candidate set containing four spatial MVPs and one temporal MVP.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a video codec that efficiently signals various transform modes and prediction modes. In some embodiments, a video decoder receives data from a bitstream for a block of pixels to be decoded as a current block of a current picture of a video. The video decoder receives from the bitstream a first signaled index and a second signaled index for the current block. The video decoder determines a first merge index and a second merge index from the first and second signaled indices. The video decoder uses the first merge index to select a first motion candidate and the second merge index to select a second motion candidate. The video decoder computes (i) a first prediction based on the first motion candidate for the current block and (ii) a second prediction based on the second motion candidate for the current block. The video decoder reconstructs the current block by using the computed first and second predictions.

In some embodiments, the video decoder receives data from a bitstream for a block of pixels to be decoded as a current block of a current picture of a video. The video decoder performs averaging, matrix vector multiplication, and/or linear interpolation based on pixels of the current block to generate a set of prediction samples of the current block. The video decoder performs an inverse secondary transform on a first set of transform coefficients to generate a second set of transform coefficients. The video decoder performs an inverse primary transform on the second set of transform coefficients to generate a set of residual samples of the current block. In some embodiments, the enabling or selection of secondary transform and/or primary transform depends on size, width, height or combination of the above for the current block. The video decoder reconstructs the current block by using the set of residual samples and the set of prediction samples.

In some embodiments, the video decoder receives data from a bitstream for a block of pixels to be decoded as a current block of a current picture of a video. The video decoder enables a primary transform by selecting a default mode when the received data from the bitstream indicates that a secondary transform is applied to the current block. The video decoder the current block by performing inverse transform operations according to the enabled primary and secondary transforms.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

FIGS. 9a-d illustrates ALWIP process for blocks of different shapes.

FIG. 11 illustrates the calculation of cost associated with residuals of a 4×4 TU.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Inter-Prediction Modes

Figure 1:
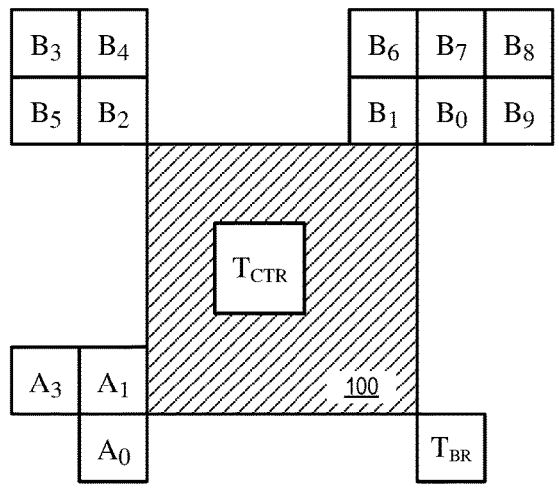
FIG. 1 shows the MVP candidates set for inter-prediction modes.

FIG. 1 shows the MVP candidates set for inter-prediction modes in HEVC (i.e., skip, merge, and AMVP). The figure shows a current block 100 of a video picture or frame being encoded or decoded. The current block 100 (which can be a PU or a CU) refers to neighboring blocks to derive the spatial and temporal MVPs for AMVP mode, merge mode or skip mode.

For skip mode and merge mode, up to four spatial merge indices are derived from $A_0$, $A_1$, $B_0$ and $B_1$, and one temporal merge index is derived from $T_{BR}$ or $T_{CTR}$ ($T_{BR}$ is used first, if $T_{BR}$ is not available, $T_{CTR}$ is used instead). If any of the four spatial merge index is not available, the position $B_2$ is used to derive merge index as a replacement. After the deriving four spatial merge indices and one temporal merge index, redundant merge indices are removed. If the number of non-redundant merge indices is less than five, additional candidates may be derived from original candidates and added to the candidates list. There are three types of derived candidates:

1. Combined bi-predictive merge candidate (derived candidate type 1)
2. Scaled bi-predictive merge candidate (derived candidate type 2)
3. Zero vector merge/AMVP candidate (derived candidate type 3)

Figure 2:
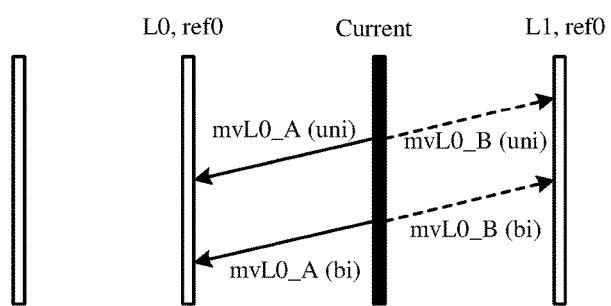
FIG. 2 illustrates a merge candidates list that includes combined bi-predictive merge candidates.

For derived candidate type 1, combined bi-predictive merge candidates are created by combining original merge candidates. Specifically, if the current slice is a B slice, a further merge candidate can be generated by combining candidates from List 0 and List 1. FIG. 2 illustrates a merge candidates list that includes combined bi-predictive merge candidates. As illustrated, two original candidates having mvL0 (the motion vector in list 0) and refIdxL0 (the reference picture index in list 0) or mvL1 (the motion vector in list 1) and refIdxL1 (the reference picture index in list 1), are used to create bi-predictive Merge candidates.

Figures 3, 4:
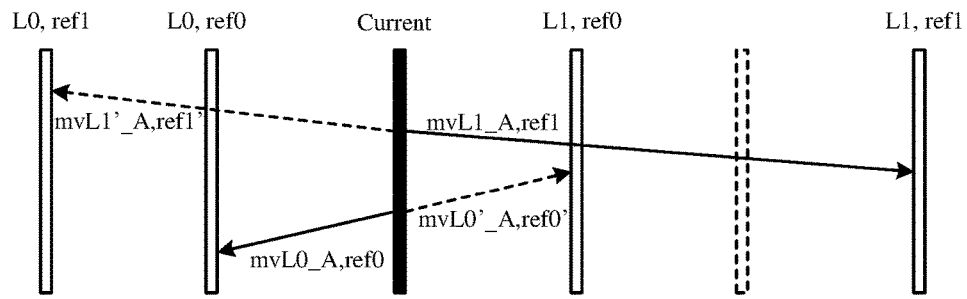
FIG. 3 illustrates a merge candidates list that includes scaled merge candidates.
FIG. 4 illustrates an example in which zero vector candidates are added to a merge candidates list or an AMVP candidates list.

For derived candidate type 2, scaled merge candidates are created by scaling original merge candidates. FIG. 3 illustrates a merge candidates list that includes scaled merge candidates. As illustrated, an original merge candidate has mvLX (the motion vector in list X, X can be 0 or 1) and refIdxLX (the reference picture index in list X, X can be 0 or 1). For example, an original candidate A is a list 0 uni-predicted MV with mvL0_A and reference picture index ref0. Candidate A is initially copied to list L1 as having reference picture index ref0'. The scaled MV mvL0'_A is calculated by scaling mvL0_A based on ref0 and ref0'. A scaled bi-predictive Merge candidate having mvL0_A and ref0 in list L0 and mvL0'_A and ref0' in list L1 is created and added to the merge candidates list. Likewise, a scaled bi-predictive merge candidate which has mvL1'_A and ref1' in List 0 and mvL1_A, ref1 in List 1 is created and added to the merge candidates list.

For derived candidate type 3, zero vector candidates are created by combining zero vectors and reference indices. If a created zero vector candidate is not a duplicate, it is added to the merge/AMVP candidates list. FIG. 4 illustrates an example in which zero vector candidates are added to a merge candidates list or an AMVP candidates list.

II. Triangular Prediction Mode (TPM)

Figure 5:
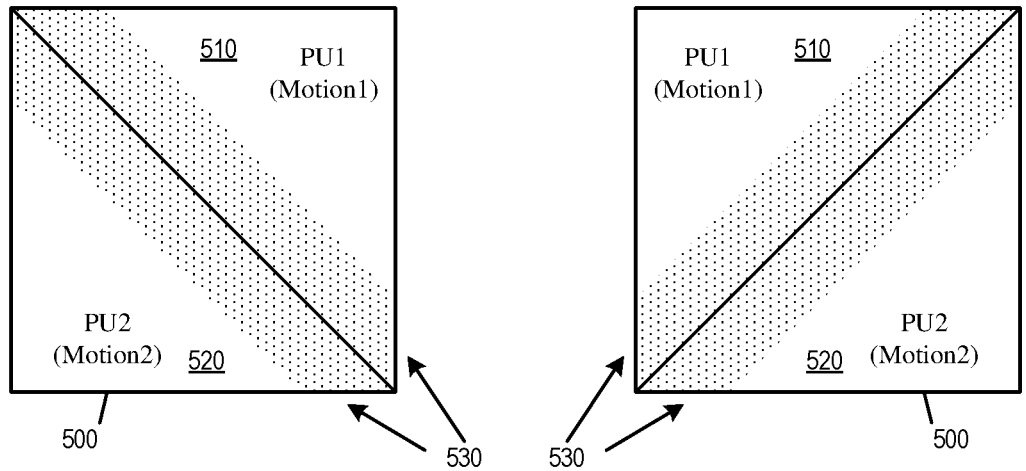
FIG. 5 illustrates a CU 500 that is coded by triangular prediction mode.

FIG. 5 illustrates a CU 500 that is coded by triangular prediction mode. As illustrated, the CU 500 is split into two triangular units 510 (PU1) and 520 (PU2), in either diagonal or inverse diagonal direction, by a partitioning that is a straight line at an angle or a diagonal line that bifurcates the CU 500. The line can be represented with a distance and an angle. For the target merge mode, each unit (for TPM, triangle unit) in the CU is inter-predicted by using its own uni-prediction motion vector and reference frame index which are derived from a candidate list which consist of bi-prediction candidates or uni-prediction candidates. In the example of FIG. 5, the triangular unit 510 is inter-predicted using the first motion information (Motion1) containing motion vector Mv1 and the corresponding reference index, and the triangular unit 520 is inter-predicted using the second motion information (Motion2) containing motion vector Mv2 and the corresponding reference index. In some embodiments, an overlap prediction region 530 situated over the diagonal boundary between the two triangular partitions is inter-predicted by a weighted sum of the inter-predictions by the first and the second motion information. The overlap prediction region 530 may therefore also be referred to as a weighted area or boundary region.

Figure 6:
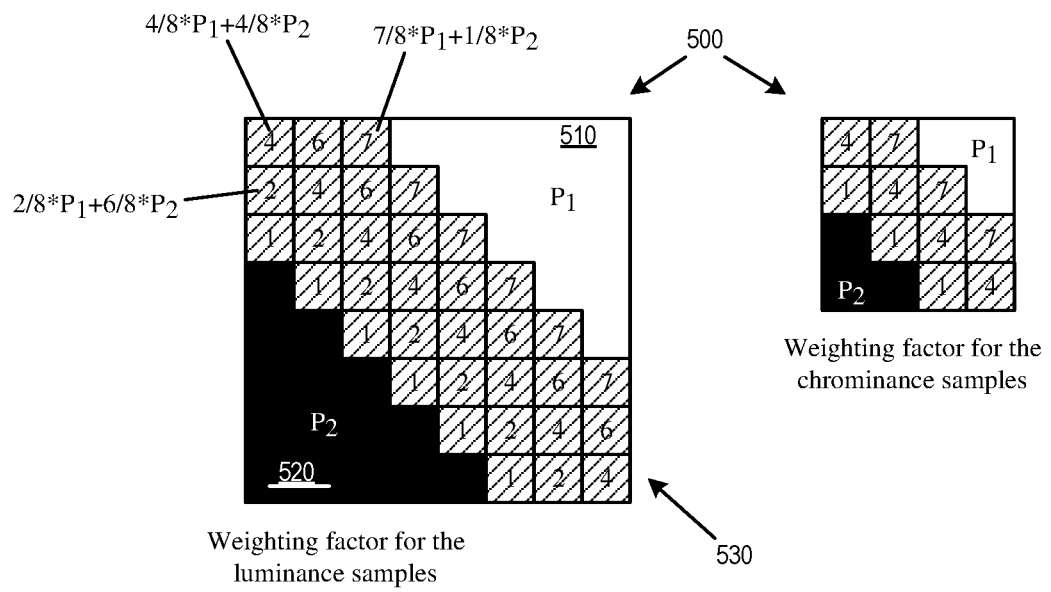
FIG. 6 illustrates applying an adaptive weighting process to the diagonal edge between the two triangular units.

FIG. 6 illustrates applying an adaptive weighting process to the diagonal edge between the two triangular units 510 and 520 (i.e., the overlap prediction region 530). Two weighting factor groups are listed as follows:

1$^{st}$ weighting factor group: {7/8, 6/8, 4/8, 2/8, 1/8} and {7/8, 4/8, 1/8} are used for the luminance and the chrominance samples, respectively;

2$^{nd}$ weighting factor group: {7/8, 6/8, 5/8, 4/8, 3/8, 2/8, 1/8} and {6/8, 4/8, 2/8} are used for the luminance and the chrominance samples, respectively.

In some embodiments, one weighting factor group is selected based on the comparison of the motion vectors of two triangular units. The 2$^{nd}$ weighting factor group is used when the reference pictures of the two triangular units are different from each other or their motion vector difference is larger than 16 pixels. Otherwise, the 1$^{st}$ weighting factor group is used. In another embodiment, only one weighting factor group is used. In another embodiment, the weighting factor for each sample is derived according to the distance between the sample and the straight line at an angle for partitioning. The example of FIG. 6 illustrates the CU 500 applying the 1$^{st}$ weighting factor group to the weighted area (or overlap prediction region) 530 along the diagonal boundary between the triangular unit 510 and the triangular unit 520.

In some embodiments, one TPM flag is signaled to indicate whether to enable TPM or not. When the TPM flag (e.g., merge_triangle_flag) indicates that TPM is enabled, at least three values are encoded into bitstream: First, a splitting direction flag (indicating whether diagonal or inverse diagonal) is encoded using bypass bin. Second, a merge index of PU0 (Idx$_0$) is encoded in the same way as the merge index of regular merge mode. Third, For PU1, instead of encoding the value of its merge index (Idx$_1$) directly, a signaled index (or Idx'$_1$) is signaled since the value of Idx$_0$ and Idx$_1$ cannot be equal. In some embodiments, the signaled index Idx'$_1$ is defined as Idx$_1$−(Idx$_1$<Idx$_0$ ? 0:1), i.e., if Idx$_1$ is less than Idx$_0$, Idx'$_1$ is set to be same as Idx$_1$. If Idx$_1$ is not less than Idx$_0$, then Idx'$_1$ is set to be Idx$_1$−1.

An example syntax for TPM signaling is provided in the table below.

| | |
|---|---|
| if( merge_triangle_flag[ x0 ][ y0 ] ) { | |
|   merge_triangle_split_dir[x0][y0] | u(1) |
|   merge_triangle_idx0[x0][y0] | ae(v) |
|   merge_triangle_idx1[x0][y0] | ae(v) |
| } | |

As mentioned, merge indices Idx$_0$ and Idx$_1$ indicate the motion candidate for PU$_0$ and PU$_1$ from the candidate list of TPM, respectively. When signaling the motion candidates for PU$_0$ and PU$_1$, the small index value is coded with shorter code words with a predefined signaling method such as truncated unary. In some embodiments, to improve the coding efficiency, merge index Idx$_0$ is changed to a signaled value Idx'$_0$ and merge index Idx$_1$ is changed to a signaled value Idx'$_1$, and the video codec signals Idx'$_0$ instead of Idx$_0$ and Idx'$_1$ instead of Idx$_1$.

In some embodiment, Idx'$_0$ is equal to Idx$_0$. In some embodiments, Idx'$_1$ is equal to Idx$_1$. In other words, the video codec is not required to compare Idx$_0$ with Idx$_1$ before calculating Idx'$_0$ or Idx'$_1$. Idx'$_x$ can be directly assigned to Idx$_x$ as simplification (for x=1 or 0).

In some embodiments, Idx'$_x$ is equal to Idx$_x$ and Idx$_y$=Idx$_x$+Idx'$_y$*sign, where (x, y) can be (0, 1) or (1, 0). For example, if x=0 and y=1, Idx'$_0$ is equal to Idx$_0$ and Idx$_1$ is equal to Idx$_0$+Idx'$_1$*sign, where sign is set to be 1 if Idx$_1$ Idx$_0$ and sign is set to be −1 otherwise (if Idx$_1$<Idx$_0$). In some embodiments, sign is inferred and doesn't need to be signaled. For example, sign can be inferred to be 1 or −1 or can be implicitly decided according to predefined criteria. The predefined criteria can depend on the block width or block height or block area or can be interleaving assigned with Idx$_0$.

In some embodiments, if Idx$_0$ is specified in an equation or table, sign is inferred to be 1; otherwise, sign is inferred to be −1. For example, Idx$_0$ is specified by fixed equations {Idx$_0$% N==n}, where N and n are predetermined. In some embodiment, Idx'$_1$ is min (abs(difference of Idx$_0$ and Idx$_1$, N). In some embodiments, constraints are applied to Idx'$_1$, or specifically N when determining Idx'$_1$. For example, N is the maximum number of TPM candidates. For another example, N is 2, 3, 4, 5, 6, 7, or 8. For another example, N can vary with block width or block height or block area. N for a block with area larger than a specific area (e.g., 64, 128, 256, 512, 1024, or 2048) is larger than N for a block with smaller area. N for a block with area smaller than a specific area is larger than N for a block with larger area.

In some embodiments, the signaled index Idx'$_1$ can be derived from merge index Idx$_0$ instead of signaling (e.g., being expressly signaled in a bitstream). For example, in some embodiments, Idx'$_1$=Idx$_0$+offset*sign, where offset=1, 2, 3, . . . , maximum number of TPM candidates−1. The offset can be fixed or vary with the block width or block height or block area. The offset for a block with area larger than a specific area (e.g., 64, 128, 256, 512, 1024, or 2048) is larger than the offset for a block with smaller area. The offset for a block with area smaller than a specific area is larger than the offset for a block with larger area.

III. Secondary Transform

In some embodiments, in addition to primary (core) transform (e.g. DCT-II) for TUs, secondary transform is used to further compact the energy of the coefficients and to improve the coding efficiency. An encoder performs the primary transform on the pixels of the current block to generate a set of transform coefficients. The secondary transform is then performed on the transform coefficients of current block.

Examples of secondary transform include Hypercube-Givens Transform (HyGT), Non-Separable Secondary Transform (NSST), and Reduced Secondary Transform (RST). RST is also referred to as Low Frequency Non-Separable Secondary Transform (LFNST). Reduced Secondary Transform (RST) is a type of secondary transform that specifies 4 transform set (instead of 35 transform sets) mapping. In some embodiments, 16×64 (or 16×48 or 8×48) matrices are employed for N×M blocks, where N≥8 and M≥8. 16×16 (or 8×16) matrices are employed for N×M blocks, where N<8 or M<8. For notational convenience, the 16×64 (or 16×48 or 8×48) transform is denoted as RST8×8 and the 16×16 (or 8×16) transform is denoted as RST4×4. For RST8×8 with 8×48 or 16×48 matrix, secondary transform is performed on the first 48 coefficients (in diagonal scanning) in the left-top 8×8 region. For RST4×4 with 8×16 or 16×16 matrix, secondary transform is performed on the first 16 coefficients (in diagonal scanning) in the left-top 4×4 region.

Figure 7:
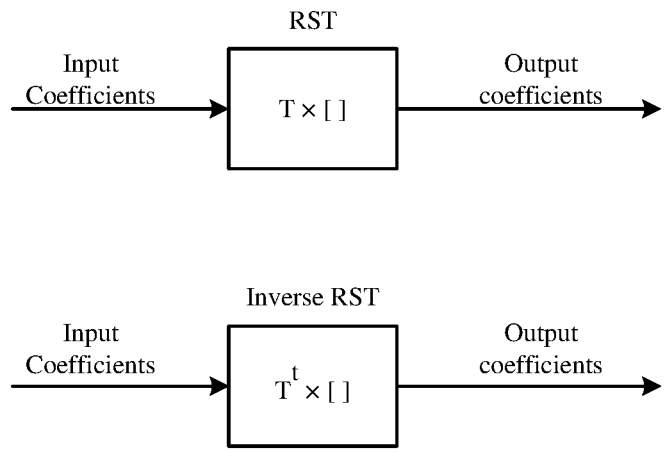
FIG. 7 illustrates forward and inverse RST.

RST is based on reduced transform (RT). The basic elements of Reduced Transform (RT) maps an N dimensional vector to an R dimensional vector in a different space, where R/N (R<N) is the reduction factor. The RT matrix is an R×N matrix as follows:

$$T_{R \times N} = \begin{bmatrix} t_{11} & t_{12} & t_{13} & \cdots & t_{1N} \\ t_{21} & t_{22} & t_{23} & & t_{2N} \\ \vdots & & & \ddots & \vdots \\ t_{R1} & t_{R2} & t_{R3} & \cdots & t_{RN} \end{bmatrix}$$

where the R rows of the transform are R bases of the N dimensional space. The inverse transform matrix for RT is the transpose of its forward transform. FIG. 7 illustrates forward and inverse reduced transforms.

In some embodiments, the RST8×8 with a reduction factor of 4 (¼ size) is applied. Hence, instead of 64×64, which is conventional 8×8 non-separable transform matrix size, 16×64 direct matrix is used. In other words, the 64×16 inverse RST matrix is used at the decoder side to generate core (primary) transform coefficients in 8×8 top-left regions. The forward RST8×8 uses 16×64 (or 16×48 or 8×48 for 8×8 block) matrices. For RST4×4, 16×16 (or 8×16 for 4×4 block) direct matrix multiplication is applied. So, for a transform block (TB), it produces non-zero coefficients only in the top-left 4×4 region. In other words, for a transform block (TB), if RST with 16×48 or 16×16 matrix is applied, except the top-left 4×4 region (the first 16 coefficients, called RST zero-out region) will have only zero coefficients. If RST with 8×48 or 8×16 matrix is applied, except the first 8 coefficients, called RST zero-out region, will have only zero coefficients.

In some embodiments, an inverse RST is conditionally applied when at least one of (1) and (2) are satisfied: (1) block size is greater than or equal to the given threshold (W>=4 && H>=4); and (2) transform skip mode flag is equal to zero. If both width (W) and height (H) of a transform coefficient block are greater than 4, then the RST8×8 is applied to the top-left 8×8 region of the transform coefficient block. Otherwise, the RST4×4 is applied on the top-left min(8, W)×min(8, H) region of the transform coefficient block. If RST index is equal to 0, RST is not applied. Otherwise, RST is applied, of which kernel is chosen with the RST index. Furthermore, RST is applied for intra CU in intra or inter slices. If a dual tree is enabled, RST indices for Luma and Chroma are signaled separately. For inter slice (the dual tree is disabled), a single RST index is signaled and used for Luma or Chroma. The RST selection method and coding of the RST index will be further described below.

In some embodiments, Intra Sub-Partitions (ISP), as a new intra prediction mode, is adopted. When ISP mode is selected, RST is disabled and RST index is not signaled. This is because performance improvement was marginal even if RST is applied to every feasible partition block, and because disabling RST for ISP-predicted residual could reduce encoding complexity.

In some embodiments, an RST matrix is chosen from four transform sets, each of which consists of two transforms. Which transform set is applied is determined from intra prediction mode as the following: (1) if one of three CCLM modes is indicated, transform set 0 is selected or the corresponding luma intra prediction mode is used in the following transform set selection table, (2) otherwise, transform set selection is performed according to the following transform set selection table:

| IntraPredMode | Tr. set index |
|---|---|
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode | 1 |

In some embodiments, the index IntraPredMode has a range of [−14, 83], which is a transformed mode index used for wide angle intra prediction. In some embodiments, 1 transform-per-set configuration is used, which greatly reduces memory usage (e.g., by half or 5 KB).

In some embodiments, a simplification method for RST is applied. The simplification method limits worst case number of multiplications per sample to less than or equal to 8. If RST8×8 (or RST4×4) is used, the worst case in terms of multiplication count occurs when all TUs consist of 8×8 TUs (or 4×4 TUs). Therefore, top 8×64 (or 8×48 or 8×16) matrices (in other words, first 8 transform basis vectors from the top in each matrix) are applied to 8×8 TU (or 4×4 TU).

In the case of blocks larger than 8×8 TU, worst case does not occur so that RST8×8 (i.e. 16×64 matrix) is applied to top-left 8×8 region. For 8×4 TU or 4×8 TU, RST4×4 (i.e. 16×16 matrix) is applied to top-left 4×4 region excluding the other 4×4 regions in order to avoid worst case happening. In the case of 4×N or N×4 TU (N≥16), RST4×4 is applied to top-left 4×4 block. With the aforementioned simplification, the worst case number of multiplications becomes 8 per sample.

Figure 8:
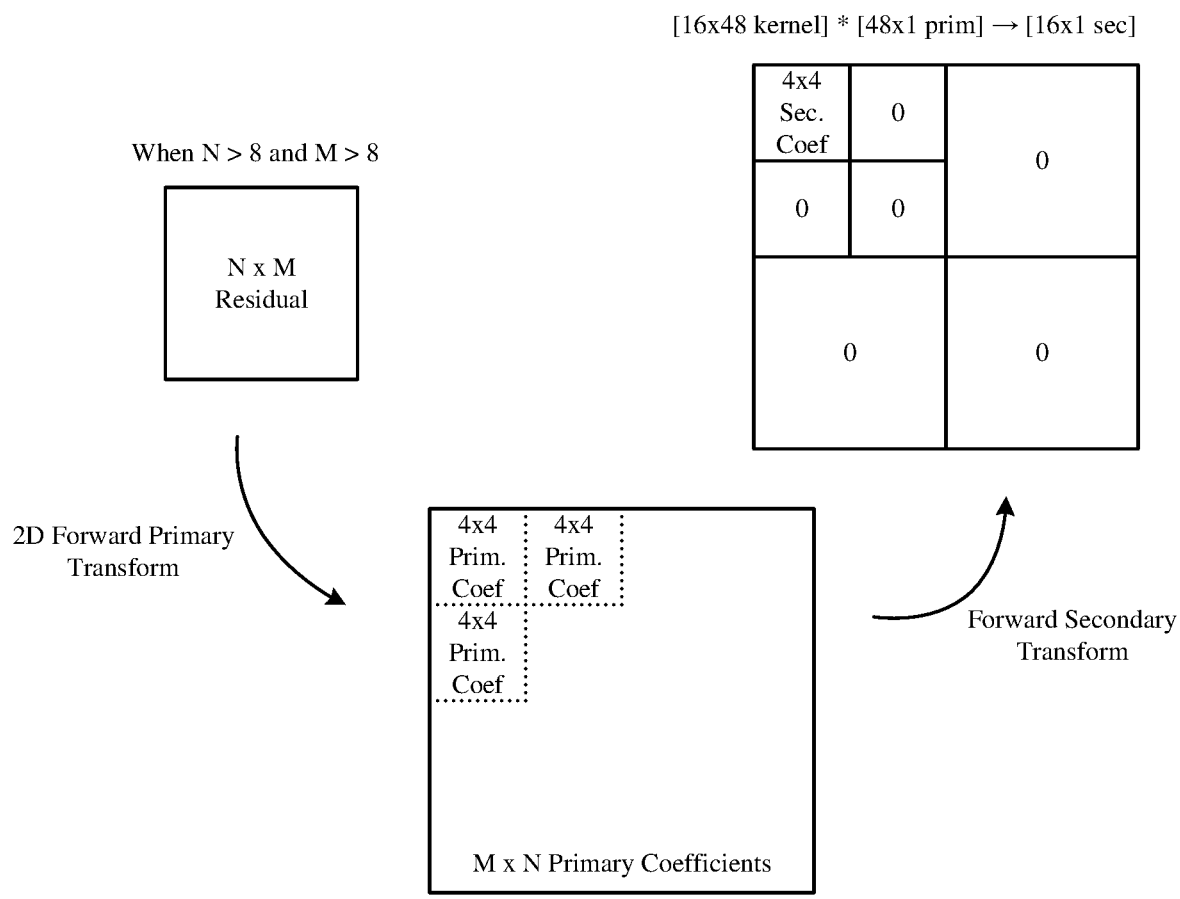
FIG. 8 illustrates 8×8 RST with reduced dimensions.

In some embodiments, RST matrices of reduced dimension are used. FIG. 8 illustrates RST with reduced dimensions. The figure illustrates an example forward RST8×8 process with 16×48 matrix. As illustrated, 16×48 matrices may be applied instead of 16×64 with the same transform set configuration, each of which takes 48 input data from three 4×4 blocks in a top-left 8×8 block excluding right-bottom 4×4 block. With the reduced dimension for RST matrices, memory usage for storing all RST matrices may be reduced from 10 KB to 8 KB with reasonable performance drop.

The forward RST8×8 with R=16 uses 16×48 matrices so that it produces non-zero coefficients only in the top-left 4×4 region. In other words, if RST is applied, except the top-left 4×4 region, called RST zero-out region, generates only zero coefficients. In some embodiments, RST index is not coded or signaled when any non-zero element is detected within RST zero-out region because it implies that RST was not applied. In such a case, RST index is inferred to be zero.

IV. Affine Linear Weighted Intra Prediction

In some embodiments, for predicting the samples of a rectangular block of width W and height H, affine linear weighted intra prediction (ALWIP) is used. ALWIP may also be referred to as matrix based intra prediction or matrix weighted intra prediction (MIP). ALWIP takes one line of H reconstructed neighbouring boundary samples left of the block and one line of W reconstructed neighbouring boundary samples above the block as input. If the reconstructed samples are unavailable, they are generated as it is done in the conventional intra prediction. The generation of the set of prediction samples for ALWIP is based on the following three steps:

(1) Averaging neighboring samples: Among the boundary samples, four samples or eight samples are selected by averaging based on block size and shape. Specifically, the input boundaries $bdry^{top}$ and $bdry^{left}$ are reduced to smaller boundaries $bdry_{red}^{top}$ and $bdry_{red}^{left}$ by averaging neighboring boundary samples according to predefined rule depends on block size.

(2) Matrix Multiplication: A matrix vector multiplication, followed by addition of an offset, is carried out with the averaged samples as an input. The result is a reduced prediction signal on a subsampled set of samples in the original block.

(3) Interpolation: The prediction signal at the remaining positions is generated from the prediction signal on the subsampled set by linear interpolation which is a single step linear interpolation in each direction.

The matrices and offset vectors needed to generate the prediction signal under ALWIP are taken from three sets of matrices ($S_0$, $S_1$, and $S_2$). The set $S_0$ consists of N matrices. N can be 16, 17, 18, or any positive integer number. Take N=16 as an example, 16 matrices $A_0^i$, $i \in \{0, \ldots, 15\}$ each of which has 16 rows and 4 columns and 16 offset vectors $b_0^i$, $i \in \{0, \ldots, 15\}$ each of size 16. Matrices and offset vectors of that set are used for blocks of size 4×4. The set $S_1$ consists of 8 matrices $A_1^i$, $i \in \{0, \ldots, 7\}$, each of which has 16 rows and 8 columns and 8 offset vectors $b_1^i$, $i \in \{0, \ldots, 7\}$ each of size 16. Matrices and offset vectors of that set are used for blocks of sizes 4×8, 8×4, and 8×8. Finally, the set $S_2$ consists of 6 matrices $A_2^i$, $i \in \{0, \ldots, 5\}$, each of which has 64 rows and 8 columns and of 6 offset vectors $i \in \{0, \ldots, 5\}$ of size 64. Matrices and offset vectors of that set or parts of these matrices and offset vectors are used for all other block-shapes.

The total number of multiplications needed in the computation of the matrix vector product is always smaller than or equal to 4×W×H. In other words, at most four multiplications per sample are required for the ALWIP modes.

In some embodiments, in a first step, the top boundary $bdry^{top}$ and the left boundary $bdry^{left}$ are reduced to smaller boundaries $bdry_{red}^{top}$ and $bdry_{red}^{left}$. Here, $bdry_{red}^{top}$ and $bdry_{red}^{left}$ both consists of 2 samples in the case of a 4×4 block, and both consist of 4 samples in all other cases. In the case of a 4×4 block, for $0 \leq i < 2$, $$bdry_{red}^{top}[i] = ((\Sigma_{j=0}^{1} bdry^{top}[i \cdot 2 + j]) + 1) >> 1$$

$$bdry_{red}^{left}[i] = ((\Sigma_{j=0}^{1} bdry^{left}[i \cdot 2 + j]) + 1) >> 1$$

Otherwise, if the block-width W is given as $W = 4 \cdot 2^k$, for $0 \leq i < 4$, $$bdry_{red}^{top}[i] = ((\Sigma_{j=0}^{2^k-1} bdry^{top}[i \cdot 2^k + j]) + (1 << (k-1))) >> k$$

$$bdry_{red}^{left}[i] = ((\Sigma_{j=0}^{2^k-1} bdry^{left}[i \cdot 2^k + j]) + (1 << (k-1))) >> k$$

In some embodiments, in the first step, the two reduced boundaries $bdry_{red}^{top}$ and $bdry_{red}^{left}$ are concatenated to a reduced boundary vector $bdry_{red}$, which is of size four for blocks of shape 4×4 and of size eight for blocks of all other shapes. A concatenation of the reduced top and left boundaries is defined as follows: (If mode refers to the ALWIP-mode)

$$bdry_{red} = \begin{cases} [bdry_{red}^{top}, bdry_{red}^{left}] & \text{for } W = H = 4 \text{ and mode} < 18 \\ [bdry_{red}^{left}, bdry_{red}^{top}] & \text{for } W = H = 4 \text{ and mode} \geq 18 \\ [bdry_{red}^{top}, bdry_{red}^{left}] & \text{for max}(W, H) = 8 \text{ and mode} < 10 \\ [bdry_{red}^{left}, bdry_{red}^{top}] & \text{for max}(W, H) = 8 \text{ and mode} \geq 10 \\ [bdry_{red}^{top}, bdry_{red}^{left}] & \text{for max}(W, H) > 8 \text{ and mode} < 6 \\ [bdry_{red}^{left}, bdry_{red}^{top}] & \text{for max}(W, H) > 8 \text{ and mode} \geq 6. \end{cases}$$

In some embodiments, for the interpolation of the subsampled prediction signal, on large blocks a second version of the averaged boundary is used. Specifically, if min(W,H)>8 and W≥H, then $W = 8 \cdot 2^l$, and, for $0 \leq i < 8$, $$bdry_{redII}^{top}[i] = ((\Sigma_{j=0}^{2^l-1} bdry^{top}[i \cdot 2^l + j]) + (1 << (l-1))) >> l.$$

Similarly, if min(W,H)>8 and H>W, $$bdry_{redII}^{left}[i] = ((\Sigma_{j=0}^{2^l-1} bdry^{left}[i \cdot 2^l + j]) + (1 << (l-1))) >> l.$$

In some embodiments, in the second step, a reduced prediction signal is generated by matrix vector multiplication. Out of the reduced input vector $bdry_{red}$, a reduced prediction signal $pred_{red}$ is generated. The latter signal is a signal on the downsampled block of width $W_{red}$ and height $H_{red}$. Here, $W_{red}$ and $H_{red}$ are defined as:

$$W_{red} = \begin{cases} 4 & \text{for max}(W, H) \leq 8 \\ \min(W, 8) & \text{for max}(W, H) > 8 \end{cases}$$

$$H_{red} = \begin{cases} 4 & \text{for max}(W, H) \leq 8 \\ \min(H, 8) & \text{for max}(W, H) > 8 \end{cases}$$

The reduced prediction signal $pred_{red}$ is computed by calculating a matrix vector product and adding an offset:

$$pred_{red} = A \cdot bdry_{red} + b.$$

Here, A is a matrix that has $W_{red} \cdot H_{red}$ rows and 4 columns if W=H=4 and 8 columns in all other cases. b is a vector of size $W_{red} \cdot H_{red}$. The matrix A and the vector b are taken from one of the sets $S_0$, $S_1$, $S_2$ as follows. An index idx=idx(W,H) is defined as follows:

$$idx(W, H) = \begin{cases} 0 & \text{for } W = H = 4 \\ 1 & \text{for max}(W, H) = 8 \\ 2 & \text{for max}(W, H) > 8. \end{cases}$$

Moreover, m is defined as follows:

$$m = \begin{cases} \text{mode} & \text{for } W = H = 4 \text{ and mode} < 18 \\ \text{mode} - 17 & \text{for } W = H = 4 \text{ and mode} \geq 18 \\ \text{mode} & \text{for max}(W, H) = 8 \text{ and mode} < 10 \\ \text{mode} - 9 & \text{for max}(W, H) = 8 \text{ and mode} \geq 10 \\ \text{mode} & \text{for max}(W, H) > 8 \text{ and mode} < 6 \\ \text{mode} - 5 & \text{for max}(W, H) > 8 \text{ and mode} \geq 6. \end{cases}$$

Then, if idx≤1 or idx=2 and min(W,H)>4, then $A=A_{idx}^m$ and $b=b_{idx}^m$. In the case that idx=2 and min(W,H)=4, one lets A be the matrix that arises by leaving out every row of $A_{idx}^m$ that, in the case W=4, corresponds to an odd x-coordinate in the downsampled block, or, in the case H=4, corresponds to an odd y-coordinate in the down-sampled block.

Finally, the reduced prediction signal is replaced by its transpose in the following cases:

W=H=4 and mode ≥18 max(W,H)=8 and mode ≥10 max(W,H)>8 and mode ≥6

The number of multiplications required for calculation of $pred_{red}$ is 4 in the case of W=H=4 since in this case A has 4 columns and 16 rows. In all other cases, A has 8 columns and $W_{red} \cdot H_{red}$ rows. In these cases, $8 \cdot W_{red} \cdot H_{red} \leq 4 \cdot W \cdot H$ multiplications are required, i.e. also in these cases, at most 4 multiplications per sample are needed to compute $pred_{red}$.

FIGS. 9a-d illustrates ALWIP process for blocks of different shapes. The ALWIP process for a block includes (1) averaging, (2) matrix vector multiplication, and (3) linear interpolation. FIG. 9a illustrates ALWIP for 4×4 blocks. Given a 4×4 block, ALWIP takes two averages along each axis of the boundary. The resulting four input samples enter the matrix vector multiplication. The matrices are taken from the set $S_0$. After adding an offset, this yields the 16 final prediction samples. Linear interpolation is not necessary for generating the prediction signal. Thus, a total of (4*16)(4*4)=4 multiplications per sample are performed.

FIG. 9b illustrates ALWIP for 8×8 blocks. Given an 8×8 block, ALWIP takes four averages along each axis of the boundary. The resulting eight input samples enter the matrix vector multiplication. The matrices are taken from the set $S_1$. This yields 16 samples on the odd positions of the prediction block. Thus, a total of (8·16)÷(8·8)=2 multiplications per sample are performed. After adding an offset, these samples are interpolated vertically by using the reduced top boundary. Horizontal interpolation follows by using the original left boundary. The interpolation process does not require any multiplications in this case. Thus, a total of 2 multiplications per sample is required to calculate ALWIP prediction.

FIG. 9c illustrates ALWIP for 8×4 blocks. Given an 8×4 block, ALWIP takes four averages along the horizontal axis of the boundary and the four original boundary values on the left boundary. The resulting eight input samples enter the matrix vector multiplication. The matrices are taken from the set $S_1$. This yields 16 samples on the odd horizontal and each vertical positions of the prediction block. Thus, a total of (8·16)+(8·4)=4 multiplications per sample are performed. After adding an offset, these samples are interpolated horizontally by using the original left boundary. The interpolation process, in this case, does not add any multiplications. Thus, a total of 4 multiplications per sample are required to calculate ALWIP prediction.

FIG. 9d illustrates ALWIP for 16×16 blocks. Given a 16×16 block, ALWIP takes four averages along each axis of the boundary. The resulting eight input samples enter the matrix vector multiplication. The matrices are taken from the set $S_2$. This yields 64 samples on the odd positions of the prediction block. Thus, a total of (8·64)÷(16·16)=2 multiplications per sample are performed. After adding an offset, these samples are interpolated vertically by using eight averages of the top boundary. Horizontal interpolation follows by using the original left boundary. The interpolation process, in this case, does not add any multiplications. Therefore, totally, two multiplications per sample are required to calculate ALWIP prediction.

For larger shapes, the procedure is essentially the same and it is easy to check that the number of multiplications per sample is less than four. For W×8 blocks with W>8, only horizontal interpolation is necessary as the samples are given at the odd horizontal and each vertical position. In this case, (8·64)÷(W·8)=64/W multiplications per sample are performed to calculate the reduced prediction. In some embodiments, for W=16, no additional multiplications are required for linear interpolation. For W>16, the number of additional multiplications per sample required for linear interpolation is less than two. Thus, total number of multiplications per sample is less than or equal to four.

For W×4 blocks with width W>8, let $A_k$ be the matrix that arises by leaving out every row that corresponds to an odd entry along the horizontal axis of the down-sampled block. Thus, the output size is 32 and again, only horizontal interpolation remains to be performed. For calculation of reduced prediction, (8·32)÷(W·4)=64/W multiplications per sample are performed. For W=16, no additional multiplications are required while, for W>16, less than 2 multiplication per sample are needed for linear interpolation. Thus, total number of multiplications is less than or equal to four. The transposed cases are treated accordingly.

V. Constraints on Secondary Transform

In some embodiments of the present application, secondary transform such as RST or LFNST can be performed when ALWIP mode is applied. In some embodiments, a video codec may perform secondary transform when ALWIP is applied under some conditions. For example, when a width, height, or area (size) of the current block is larger or smaller than a certain threshold. To be more specific, in one embodiment, after it is determined that width and height of the current block are greater than or equal to a first threshold, secondary transform is performed in ALWIP mode. In one embodiment, after it is determined that width and height of the current block are smaller than a second threshold, secondary transform is performed in ALWIP mode. In some embodiments, the number of secondary transform candidates is the same as that for regular intra mode. In some embodiments, the number of secondary transform candidates is reduced to N when ALWIP is applied (N can be 1, 2, 3, or 4 in some embodiments.)

In some embodiments, the secondary transform is performed in ALWIP mode when two following constraints are met: 1) it is determined that width and height of the current block are greater than or equal to a first threshold; and 2) it is determined that an index of the secondary transform is larger than an index threshold, such as zero (0). In more detail, it is first decided whether width and height of the current block are greater than or equal to a first threshold. When the first deciding step is positive, constraint 1) is met and the index of the secondary transform is signaled. Following a second deciding step is performed to see whether the signaled index is larger than the index threshold. If the second deciding step is positive, then constraint 2) is met. In some embodiments, it is required that more constraints should be met before the index of secondary transform can be signaled. However, these are examples under the spirit of the present application and should not limit the scope of the present application.

The transform mode for primary transform indicates one transform type for horizontal transform and one transform type for vertical transform. In some embodiments, the transform mode for primary transform can be implicitly decided or explicitly signaled with a flag and/or an index. For example, in some embodiments, the transform mode is indicated with an index, and when the index is 0, the transform mode for primary transform is assigned with the default transform mode like DCT-II for both directions. Otherwise, one transform mode for primary transform (that indicates a horizontal transform and a vertical transform) is selected from any combination with any signaling order of the candidate transform set, e.g., {(DST-VII, DST-VII), (DCT-VIII, DCT-VIII), (DST-VII, DCT-VIII), (DCT-VIII, DST-VII)}. For a transform mode for the secondary transform such as RST or LFNST, an index is signaled to indicate one candidate from the candidate set that includes N (e.g. 2 or 3) candidates. RST index equal to 0 means RST is not applied.

In some embodiments, secondary transform (e.g., RST) can be performed on the coefficients generated with residuals and primary transform. In some embodiments, when primary transform is applied, secondary transform cannot be used. In some embodiments, when the primary transform is not equal to the default transform mode (e.g., (DCT-II, DCT-II)) or when the index for the primary transform is larger than 0, 1, 2, or 3, secondary transform cannot be applied, or the number of candidates for the secondary transform is reduced to 1 or 2, or the index of secondary transform cannot be equal to the largest index like 3.

In some embodiments, the transform mode for primary transform is a specific transform mode (e.g., (DCT-II, DCT-II) or (DST-VII, DST-VII)), secondary transform cannot be applied, or the number of candidates for the secondary transform is reduced to 1 or 2, or the index of secondary transform cannot be equal to the largest index (e.g., 3).

In some embodiments, for primary transform, when the horizontal transform is equal to the vertical transform, the secondary transform cannot be applied, or the number of candidates for the secondary transform is reduced to 1 or 2, or the index of secondary transform cannot be equal to the largest index (e.g., 3).

In some embodiments, when secondary transform is applied (e.g. the index for secondary transform is larger than 0), primary transform cannot be used, or the number of candidates for the primary transform is reduced to 1 or 2, or the index of primary transform cannot be equal to the largest index (e.g., 3). For example, when secondary transform is applied, a default primary transform mode is used and the index of default primary transform mode is set to 0 which means the default primary transform mode for primary transform is DCT-II. In some embodiments, the index of default primary transform is inferred without signaling. In some embodiments, the transform types for primary transform will not be further changed with implicit transform type assignment. In some embodiments, when secondary transform is equal to a specific number (e.g., 1, 2, or 3), primary transform is not used, or the number of candidates for the primary transform is reduced to 1 or 2, or the index of primary transform does not equal to the largest index (e.g., 3).

VI. Efficient Signaling of Multiple Transforms

In some embodiments, an efficient signaling method for multiple transforms is used to further improve coding performance in a video codec. Instead of using predetermined and fixed codeword for different transforms, in some embodiments, the transform index (indicate which transform to be used) are mapped into different codeword dynamically using a predicted or predefined method. Such a signaling method may include the following steps:

First, a predicted transform index is decided by a predetermined procedure. In the procedure, a cost is given to each candidate transform and the candidate transform with the smallest cost will be the chosen as the predicted transform and the transform index will be mapped to the shortest codeword. For the rest of the transforms, there are several methods to assign the codeword, where in general an order is created for the rest of transforms and the codeword can then be given according to that order (For example, shorter codeword is given to the one in the front of the order).

Second, after a predicted transform is decided and all other transforms are also mapped into an ordered list, the encoder may compare the target transform to be signaled with the predicted transform. If the target transform (decided by coding process) happens to be the predicted transform, the codeword for the predicted transform (always the shortest one) can be used for the signaling. If that is not the case, the encoder may further search the order to find out the position of the target transform and the final codeword corresponding to it. For the decoder, the same cost will be calculated and the predicted transform and the same order will also be created. If the codeword for the predicted transform is received, the decoder knows that the target transform is the predicted transform. If that is not the case, the decoder can look up codeword in the order to find out the target transform. From the above descriptions, it can be assumed that if the hit rate of the (transform) prediction (rate of successful prediction) becomes higher, the corresponding transform index can be coded using fewer bits than before.

For higher prediction hit rate, there are several methods to calculate the cost of multiple transforms. In some embodiments, boundary matching method is used to generate the cost. For coefficients of one TU and one particular transform, they (the TU coefficients) are de-quantized and then inverse transformed to generate the reconstructed residuals. By adding those reconstructed residuals to the predictors (either from intra or inter modes), the reconstructed current pixels are acquired, which form one hypothesis reconstruction for that particular transform. Assuming that the reconstructed pixels are highly correlated to the reconstructed neighboring pixels, a cost can be given to measure the boundary similarity.

Figure 10:
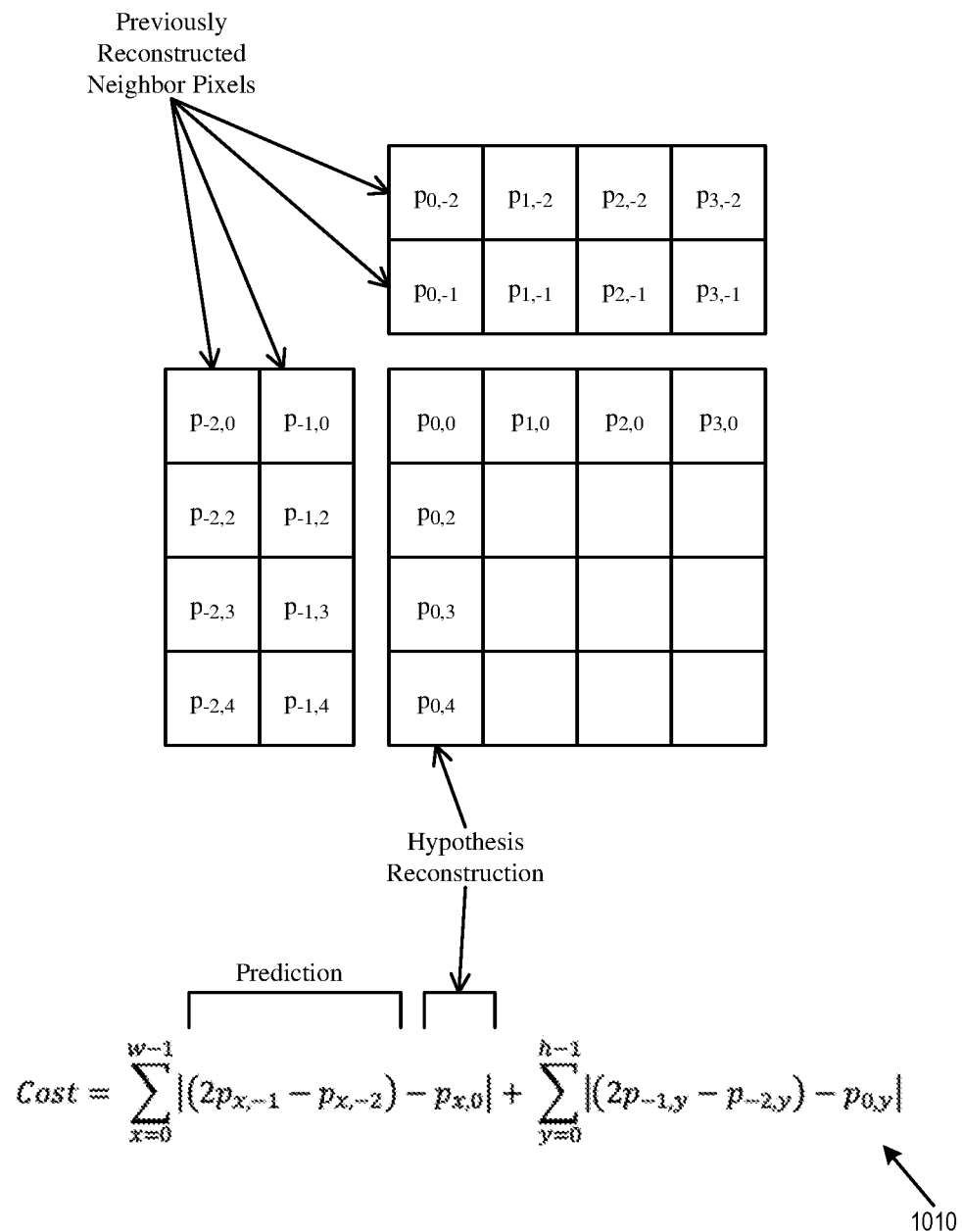
FIG. 10 illustrates TU hypothesis reconstruction generation, in which a cost function is used to measure boundary similarity.

FIG. 10 illustrates TU hypothesis reconstruction generation, in which a cost function is used to measure boundary similarity. As illustrated, for one 4×4 TU, one hypothesis reconstruction is generated for one particular transform, and the cost can be calculated using those pixels across the top and above boundaries by an equation 1010 as shown in the figure. In this boundary matching process, only the border pixels are reconstructed, inverse transform operations (for non-border pixels) can be avoided for complexity reduction. In some embodiments, the TU coefficients can be adaptively scaled or chosen for the reconstruction. In some embodiments, the reconstructed residuals can be adaptively scaled or chosen to do the reconstruction. In some embodiments, different number of boundary pixels or different shape of boundary (only top, only above or other extension) can be used to calculate the cost. In some embodiments, different cost function can be used to obtain a better measurement of the boundary similarity. For example, it is possible to consider the different intra prediction directions to adjust the boundary matching directions.

In some embodiments, the cost can be obtained by measuring the features of the reconstructed residuals. For coefficients of one TU and one particular secondary transform, they (the coefficients of the TU) are de-quantized and then inverse transformed to generate the reconstructed residuals. A cost can be given to measure the energy of those residuals.

FIG. 11 illustrates the calculation of cost associated with residuals of a 4×4 TU. For one 4×4 TU, the cost is calculated as the sum of absolute values of different sets of residuals.

In some embodiments, different sets of different shapes of residuals can be used to generate the cost. In the example of FIG. 11, Cost1 is calculated as the sum of absolute values of the top row and the left, cost2 is calculated as the sum of absolute values of the center region of the residuals, and cost3 is calculated as the sum of absolute values of the bottom right corner region of the residuals.

In some embodiments, the transforms here (transforms being signaled) may be secondary transform and/or primary transform and/or transform skip mode. For a TU, transform skip or one transform mode for the primary transform is signaled with an index. When the index (for selecting a transform) is equal to zero, the default transform mode (e.g. DCT-II for both directions) is used. When the index is equal to one, transform skip is used. When the index is larger than 1, one of multiple transform modes (e.g. DST-VII or DCT-VIII used for horizontal and/or vertical transform) can be used. As for the secondary transform, an index (from 0 to 2 or 3) is used to select one secondary transform candidate. When the index is equal to 0, secondary transform is not applied. In some embodiments, the transforms, including transform skip mode and/or primary transform and/or secondary transform can be signaled with an index. The maximum number of this index is the number of candidates for primary transform+the number of candidates for secondary transform+1 for transform skip mode.

In some embodiments, the method for efficient signaling of multiple transforms is used to determine a signaling order. For example, there are 4 candidate primary transform combinations (one default transform+different combinations), 4 candidate secondary transform combination (no secondary transform+2 or 3 candidates), and transform skip mode. The method for efficient signaling of multiple transform can be used for any subset of the total combinations to generate the corresponding costs and the signaling can be changed accordingly. In some embodiments, the transforms here (the transforms being signaled) includes transform skip mode and the default transform mode for the primary transform. If the cost of the transform skip mode is smaller than the cost of the default transform mode, the codeword length of transform skip mode is shorter than the codeword length of the default transform mode. For example, in some embodiments, the index for transform skip mode is assigned with 0 and the index for the default transform mode is assigned with 1. In some embodiments, the transform here (the transform being signaled) is the transform skip mode. If the cost of the transform skip mode is smaller than a particular threshold, the codeword length of the transform skip mode is shorter than other transforms for the primary transform. The threshold can vary with the block width or block height or block area.

In some embodiments, the prediction mode for a CU can be indicated with an index. The prediction mode may be inter mode, intra mode, intra-block copy mode (IBC mode), and/or a new added combined mode. In some embodiments, the context for this index can be decided independently of the information from neighboring blocks. In some embodiments, the context for the first bin or the bin (to decide whether the prediction mode is intra mode or not) can be decided by counting the number of intra-coded neighboring blocks. For example, the neighboring blocks contain left and/or above, one 4×4 block from left and/or one 4×4 block from above, denoted as $A_1$ and/or $B_1$, respectively. For another example, the neighboring blocks contain left (denoted as $A_1$), above (denoted as $B_1$), above-left (denoted as $B_2$), left-bottom (denoted as $A_0$), and/or above-right (denoted as $B_0$). For another example, neighboring blocks contain the 4×4 blocks in neighboring 4×8, 8×4, or 8×8 area such as left (denoted as $A_1$), left-related (denoted as $A_3$), above (denoted as $B_1$), above-related (denoted as $B_1$), where x can be 0, 2, 3, 4, 5, 6, 7, 8, or 9), and/or left-bottom (denoted as $A_0$).

In some embodiments, the context for the first bin (or the bin to decide the prediction mode is intra mode or not) may depend on the neighboring blocks from any one or any combination of {left, above, right, bottom, above-right, above-left}. For example, the neighboring blocks from left and/or above can be used. In some embodiments, the context for the first bin (or the bin to decide the prediction mode is intra mode or not) cannot reference the cross-CTU-row information. In some embodiments, only the neighboring blocks from left ($A_1$) and/or left-related ($A_3$) can be used. In some embodiments, the neighboring blocks form left ($A_1$) and/or left-related ($A_3$), and/or the neighboring blocks from above ($B_1$) in the same CTU, and/or above-related (e.g. $B_x$, where x can be 0, 2, 3, 4, 5, 6, 7, 8, or 9) in the same CTU can be used.

VI. Settings for Combined Intra/Inter Prediction

In some embodiments, when a CU is coded in merge mode, and if the CU contains at least 64 luma samples (that is, CU width times CU height is equal to or larger than 64), an additional flag is signaled to indicate if the combined inter/intra prediction (CIIP) mode is applied to the current CU. In order to form the CIIP prediction, an intra prediction mode is first derived from two additional syntax elements. Up to four possible intra prediction modes can be used: DC, planar, horizontal, or vertical. Then, the inter prediction and intra prediction signals are derived using regular intra and inter decoding processes. Finally, weighted averaging of the inter and intra prediction signals is performed to obtain the CIIP prediction. In some embodiments, the CIIP mode is simplified by reducing the number of intra modes allowed from 4 to only 1, i.e., planar mode, and the CIIP most probable mode (MPM) list construction is therefore also removed.

The weight for intra and inter predicted samples are adaptively selected based on the number of neighboring intra-coded blocks. The (wIntra, wInter) weights are adaptively set as follows. If both top and left neighbors are intra-coded, (wIntra, wInter) is set equal to (3,1). Otherwise, if one of these blocks is intra-coded, these weights are identical, i.e., (2,2), else the weights are set equal to (1,3).

In some embodiments, a neighbor-based weighting method for CIIP and the weight for intra prediction and the weight for inter prediction are denoted as (wintra, winter). In this neighbor-based weighting method, both of the left and above neighboring block are used to decide the weights for intra and inter prediction when planar mode is selected to be the intra prediction mode for CIIP. In some embodiments, there are three weight combinations, including comb1={3, 1}, comb2={2, 2}, and comb3={1, 3}.

For some embodiments, the weights used for combining intra prediction and inter prediction (wintra, winter, respectively), can be selected from any subset of the weighting pool according to a set of weight-combination settings. For generating the final prediction for CIIP, the intra prediction multiplied by wintra is added with the inter prediction multiplied by winter and then a right-shift N is applied. The number of wintra and winter may be changed according to N. For example, the weighting pool can be {(1, 3), (3, 1), (2, 2)} when N=2. For another example, the weighting pool can be {(2, 6), (6, 2), (4, 4)} when N=3. These two examples can be viewed as the same weight setting.

In some embodiments, any subset of {above, left, above-left, above-right, bottom, bottom-left} can be used to decide the weights for CIIP according to a set of block-position settings. In the following description, comb1, comb2, and comb3 can be equal to the settings described above, or can be set as any subset, proposed in weight-combination settings, with any order. For example, when the weighting pool is {(3, 1), (2, 2), (1, 3)}, comb1, comb2, and comb3 can be (1, 3), (2, 2), and (3, 1), respectively, or can be (3, 1), (2, 2), and (1, 3), respectively, or any other possible ordering. In some embodiments, only left block is used (to decide the weights for CIIP). For example, in some embodiments, if both top and left neighbors are intra-coded, (wIntra, wInter) is set equal to comb1; otherwise, if one of these blocks is intra-coded, these weights are identical, i.e., comb2, else the weights are set equal to comb3. In some embodiments, if the above block is not in the same CTU for the current block, and if left neighbor is intra-coded, (wIntra, wInter) is set equal to comb1; otherwise, these weights are identical, i.e., comb2, or comb3. In some embodiments, at least left block is used (to decide the weights for CIIP). In another embodiment, when above block is used (to decide the weights for CIIP), one constraint may need. When the above block is not in the same CTU for the current block, the above block should not be treated as an intra mode. For example, in some embodiments, if both top and left neighbors are intra-coded, (wIntra, wInter) is set equal to comb1; otherwise, if one of these blocks is intra-coded, these weights are identical, i.e., comb2, else the weights are set equal to comb3. If the above block is not in the same CTU for the current block, (wintra, winter) does not equal to comb1. When the above block is not in the same CTU for the current block, the above block should not be considered. For example, in some embodiments, if both top and left neighbors are intra-coded, (wintra, winter) is set equal to comb1; otherwise, if one of these blocks is intra-coded, these weights are identical for intra and inter weights, i.e., comb2, else the weights are set equal to comb3. If the above block is not in the same CTU for the current block, and if the left neighbor is intra-coded, (wintra, winter) is set equal to comb1; otherwise, these weights are identical for intra and inter weights, i.e., comb2, or comb3.

In some embodiments, when the blocks used to decide the weights are all of (coded by) intra mode, wintra is set to be larger than winter. For example, (wintra, winter)=(3, 1). In some embodiments, when the number of the blocks used to decide for the weights is larger than a particular threshold (e.g., 1), wintra is set to be larger than winter, e.g., (wintra, winter)=(3, 1). In some embodiments, when the blocks used to decide the weights are not all of (coded by) intra mode, wintra is equal to winter, e.g., (wintra, winter)=(2, 2). In some embodiments, when the number of the blocks used to decide the weights are less than a particular threshold (e.g., 1), wintra is equal to winter, e.g., (wintra, winter)=(2, 2). In some embodiments, when the number of the blocks used to decide the weights are less than a particular threshold (e.g., 1), wintra is equal to winter, e.g., (wintra, winter)=(2, 2). In some embodiment, when the blocks used to decide for the weights are not all of (coded by) intra mode, wintra is equal to winter, e.g., (wintra, winter)=(2, 2).

In some embodiments, the CIIP weighting (wintra, winter) for a CU can use a unified method with how to decide the context for other prediction modes. For example, the CIIP weighting can be decided independent of the information from neighboring blocks. In some embodiments, the CIIP weighting can be decided by counting the number of intra-coded neighboring blocks. For example, the neighboring blocks contain left and/or above, one 4×4 block from left and/or one 4×4 block from above, denoted as $A_1$ and/or $B_1$, respectively. For another example, the neighboring blocks contain left (denoted as $A_1$), above (denoted as $B_1$), above-left (denoted as $B_2$), left-bottom (denoted as $A_0$), and/or above-right (denoted as $B_0$). For another example, neighboring blocks contain the 4×4 blocks in neighboring 4×8, 8×4, or 8×8 area such as left (denoted as $A_1$), left-related (denoted as $A_3$), above (denoted as $B_1$), above-related (denoted as $B_x$, where x can be 0, 2, 3, 4, 5, 6, 7, 8, or 9), and/or left-bottom (denoted as $A_0$).

In some embodiments, the CIIP weighting can depend on the neighboring blocks from any one or any combination of {left, above, right, bottom, above-right, above-left}. In some embodiments, the neighboring blocks from left and/or above can be used. In some embodiments, the CIIP weighting cannot reference the cross-CTU-row information. For example, only the neighboring blocks from left ($A_1$) and/or left-related ($A_3$) can be used (since $A_1$ and $A_3$ are in the same CTU-row as the current block). For another example, the neighboring blocks form left ($A_1$) and/or left-related ($A_3$), and/or the neighboring blocks from above ($B_1$) in the same CTU, and/or above-related (e.g. $B_x$, where x can be 0, 2, 3, 4, 5, 6, 7, 8, or 9) in the same CTU can be used.

For some embodiments, any combination of above can be applied. Any variances of above can be implicitly decided with the block width or block height or block area, or explicitly decided by a flag signaled at CU, CTU, slice, tile, tile group, SPS, or PPS level.

Any of the foregoing proposed methods can be implemented in encoders and/or decoders. For example, any of the proposed methods can be implemented in an inter/intra/transform coding module of an encoder, a motion compensation module, a merge candidate derivation module of a decoder. Alternatively, any of the proposed methods can be implemented as a circuit coupled to the inter/intra/transform coding module of an encoder and/or motion compensation module, a merge candidate derivation module of the decoder.

VII. Example Video Encoder

Figure 12:
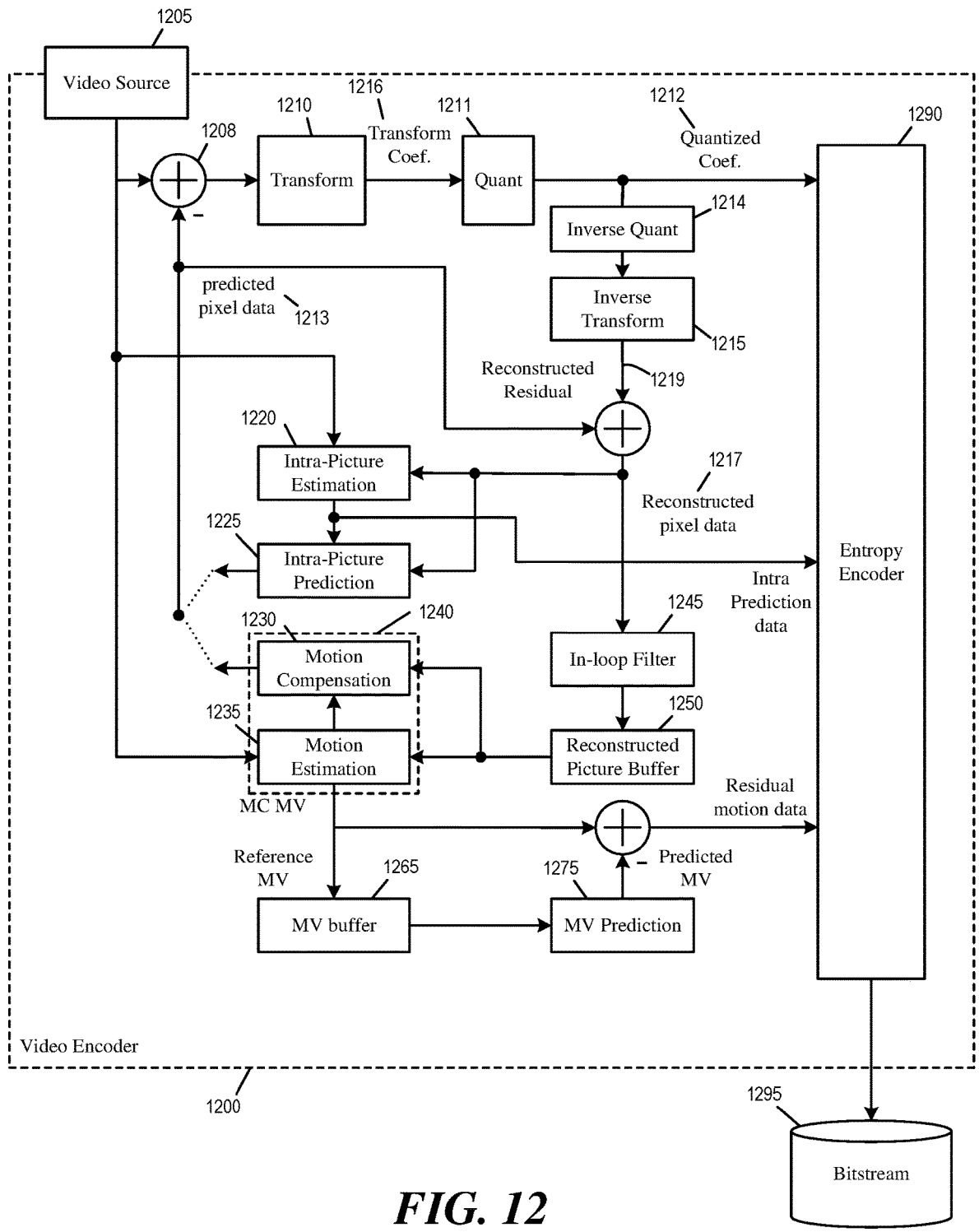
FIG. 12 illustrates an example video encoder 1200 that implements various primary transforms, secondary transforms, and/or prediction modes.

FIG. 12 illustrates an example video encoder 1200 that implements various primary transforms, secondary transforms, and/or prediction modes. As illustrated, the video encoder 1200 receives input video signal from a video source 1205 and encodes the signal into bitstream 1295. The video encoder 1200 has several components or modules for encoding the signal from the video source 1205, at least including some components selected from a transform module 1210, a quantization module 1211, an inverse quantization module 1214, an inverse transform module 1215, an intra-picture estimation module 1220, an intra-prediction module 1225, a motion compensation module 1230, a motion estimation module 1235, an in-loop filter 1245, a reconstructed picture buffer 1250, a MV buffer 1265, and a MV prediction module 1275, and an entropy encoder 1290. The motion compensation module 1230 and the motion estimation module 1235 are part of an inter-prediction module 1240.

In some embodiments, the modules 1210-1290 are modules of software instructions being executed by one or more processing units (e.g., a processor) of a computing device or electronic apparatus. In some embodiments, the modules 1210-1290 are modules of hardware circuits implemented by one or more integrated circuits (ICs) of an electronic apparatus. Though the modules 1210-1290 are illustrated as being separate modules, some of the modules can be combined into a single module.

The video source 1205 provides a raw video signal that presents pixel data of each video frame without compression. A subtractor 1208 computes the difference between the raw video pixel data of the video source 1205 and the predicted pixel data 1213 from the motion compensation module 1230 or intra-prediction module 1225. The transform module 1210 converts the difference (or the residual pixel data or residual signal 1209) into transform coefficients (e.g., by performing Discrete Cosine Transform, or DCT). The quantization module 1211 quantizes the transform coefficients into quantized data (or quantized coefficients) 1212, which is encoded into the bitstream 1295 by the entropy encoder 1290.

The inverse quantization module 1214 de-quantizes the quantized data (or quantized coefficients) 1212 to obtain transform coefficients, and the inverse transform module 1215 performs inverse transform on the transform coefficients to produce reconstructed residual 1219. The reconstructed residual 1219 is added with the predicted pixel data 1213 to produce reconstructed pixel data 1217. In some embodiments, the reconstructed pixel data 1217 is temporarily stored in a line buffer (not illustrated) for intra-picture prediction and spatial MV prediction. The reconstructed pixels are filtered by the in-loop filter 1245 and stored in the reconstructed picture buffer 1250. In some embodiments, the reconstructed picture buffer 1250 is a storage external to the video encoder 1200. In some embodiments, the reconstructed picture buffer 1250 is a storage internal to the video encoder 1200.

The intra-picture estimation module 1220 performs intra-prediction based on the reconstructed pixel data 1217 to produce intra prediction data. The intra-prediction data is provided to the entropy encoder 1290 to be encoded into bitstream 1295. The intra-prediction data is also used by the intra-prediction module 1225 to produce the predicted pixel data 1213.

The motion estimation module 1235 performs inter-prediction by producing MVs to reference pixel data of previously decoded frames stored in the reconstructed picture buffer 1250. These MVs are provided to the motion compensation module 1230 to produce predicted pixel data.

Instead of encoding the complete actual MVs in the bitstream, the video encoder 1200 uses MV prediction to generate predicted MVs, and the difference between the MVs used for motion compensation and the predicted MVs is encoded as residual motion data and stored in the bitstream 1295.

The MV prediction module 1275 generates the predicted MVs based on reference MVs that were generated for encoding previously video frames, i.e., the motion compensation MVs that were used to perform motion compensation. The MV prediction module 1275 retrieves reference MVs from previous video frames from the MV buffer 1265. The video encoder 1200 stores the MVs generated for the current video frame in the MV buffer 1265 as reference MVs for generating predicted MVs.

The MV prediction module 1275 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 1295 by the entropy encoder 1290.

The entropy encoder 1290 encodes various parameters and data into the bitstream 1295 by using entropy-coding techniques such as context-adaptive binary arithmetic coding (CABAC) or Huffman encoding. The entropy encoder 1290 encodes various header elements, flags, along with the quantized transform coefficients 1212, and the residual motion data as syntax elements into the bitstream 1295. The bitstream 1295 is in turn stored in a storage device or transmitted to a decoder over a communications medium such as a network.

The in-loop filter 1245 performs filtering or smoothing operations on the reconstructed pixel data 1217 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 13:
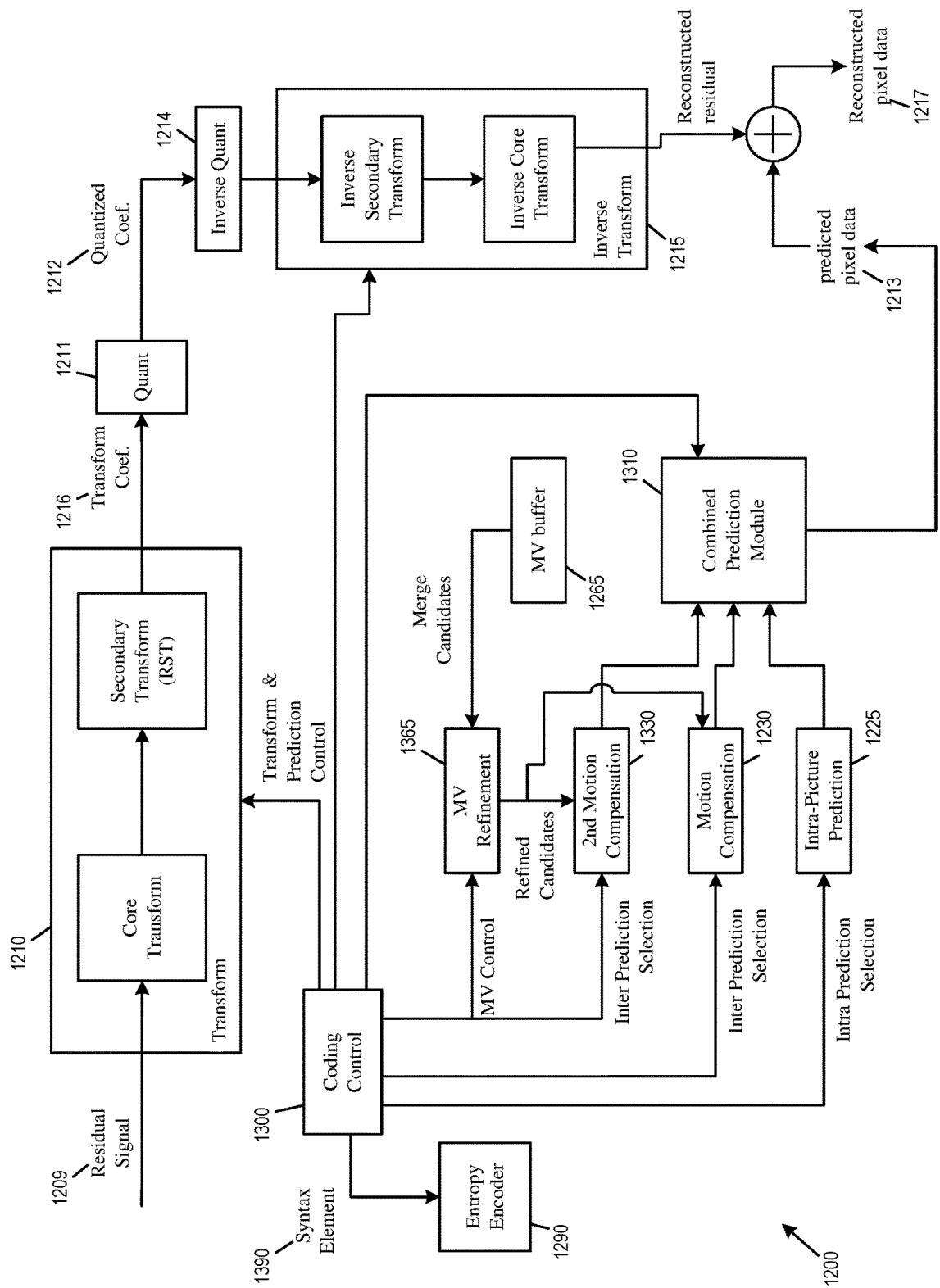
FIG. 13 illustrates portions of the encoder 1200 that enables and disables various primary transforms, secondary forms, and/or prediction modes.

FIG. 13 illustrates portions of the encoder 1200 that enables and disables various primary transforms, secondary transform, and/or prediction modes. Specifically, for each block of pixels, the encoder 1200 determines whether to perform a particular type of secondary transform (e.g., RST or LFNST), whether to perform a particular type of primary transform (e.g., DCT-II), whether to perform a particular type of prediction (e.g. ALWIP, TPM, or CIIP), and how to signal in the bitstream 1295 which modes are enabled.

As illustrated, the transform module 1210 performs primary (core) transform and/or secondary transform (e.g., RST) on the residual signal 1209, and the inverse transform module 1215 performs corresponding inverse primary transform and/or inverse secondary transform. The encoder 1200 selects a primary transform and/or a secondary transform for the transform module 1210 and the inverse transform module 1215. The video encoder 1200 also implements a combined prediction module 1310 that may receive intra-prediction values generated by the intra-picture prediction module 1225 or inter-prediction values from the motion compensation module 1230, or a second motion compensation module 1330. The combined prediction module 1310 in turn generates the predicted pixel data 1213.

The MV buffer 1265 provides the merge candidates to the motion compensation modules 1230 and/or 1330. The MV buffer 1265 also stores the motion information and the mode directions used to encode the current block for use by subsequent blocks. The merge candidates may be altered, expanded, and/or refined by a MV refinement module 1365.

The encoder 1200 includes a coding control module 1300. The coding control module 1300 controls the operation of the MV refinement module 1365. The coding control module 1300 also controls the transform and/or prediction operations of the encoder. For example, the coding control module 1300 determines whether to perform secondary transform and which type of secondary transform to perform (e.g., RST). For another example, the coding control module 1300 determines which type of primary transform to perform (e.g., DCT-II). The coding control module 1300 controls the transform operations (primary and/or secondary) of the transform module 1210 and the inverse transform operations (primary and/or secondary) of the inverse transform module 1215.

The coding control module 1300 may enable the intra-prediction module 1225, the motion compensation module 1230, and/or the second motion compensation module 1330 to implement various prediction modes. Specifically, the coding control module 1300 may enable the motion compensation module 1230 and/or the second motion compensation module 1330 to implement TPM. The coding control module 1300 may enable the motion compensation module 1230 and/or the intra-prediction module 1225 to implement CIIP. The coding control module 1300 may also enable the combined prediction module 1310 to adopt different weighting schemes when combining prediction signals from intra-picture prediction module 1225, the motion compensation module 1230, and/or the second motion compensation module 1330, such as for the overlap prediction region 530 situated over the diagonal or straight line boundary of TPM.

The coding control module 1300 may also be used to implement or define interactions between the various transform and prediction modes. For example, in some embodiments, the coding control module 1300 may enable both ALWIP operations and RST operations for coding the current block. The coding control module 1300 may further condition the enabling of both ALWIP and RST upon a size, width, or height of the current block (e.g., RST can be performed in an ALWIP block only if the block width and/or height is larger than or equal to a certain threshold size like 16). In some embodiments, the coding control module 1300 would decide the secondary transform is performed in ALWIP mode when two following constraints are met: 1) it is determined that width and height of the current block are greater than or equal to a first threshold; and 2) it is determined that an index of the secondary transform is larger than an index threshold, such as zero (0). In more detail, it is first decided whether width and height of the current block are greater than or equal to a first threshold. When the first deciding step is positive, constraint 1) is met and the index of the secondary transform is signaled. A following second deciding step is performed to see whether the signaled index is larger than the index threshold. If the second deciding step is positive, then constraint 2) is met. In some embodiments, it is required that more constraints should be met before the index of secondary transform can be signaled. However, these are examples under the spirit of the present application and should not limit the scope of the present application.

As another example, the coding control module 1300 may select a default primary transform mode such as DCT-II for both horizontal and vertical transform whenever a secondary transform mode is enabled (e.g., having a non-zero index.) The coding control module 1300 may also be used to signal parameters or settings (e.g., merge index) as syntax elements of the bitstream 1295. For example, for a block that is coded by TPM mode, the coding control module 1300 may signal two signaled indices (Idx'1 and Idx'0) to the bitstream 1295 rather than the actual merge indices (Idx0 and Idx1) used to encode the two PUs of the current block.

Figure 14:
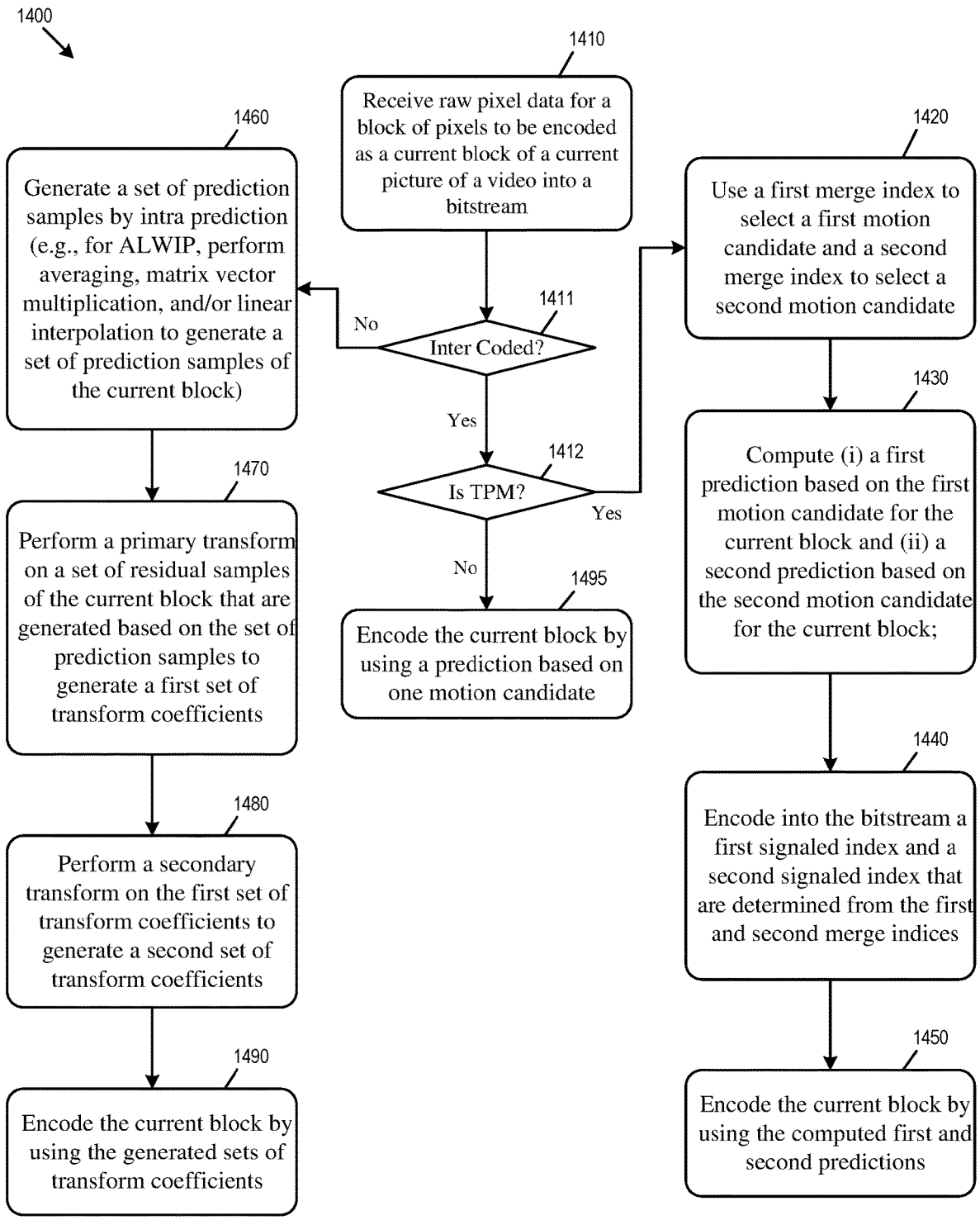
FIG. 14 conceptually illustrates a process 1400 for encoding a block of pixels by enabling certain primary transform, secondary transform, and/or prediction modes.

FIG. 14 conceptually illustrates a process 1400 for encoding a block of pixels by enabling certain primary transform, secondary transform, and/or prediction modes. In some embodiments, one or more processing units (e.g., a processor) of a computing device implementing the encoder 1200 performs the process 1400 by executing instructions stored in a computer readable medium. In some embodiments, an electronic apparatus implementing the encoder 1200 performs the process 1400.

The encoder receives (at block 1410) raw pixel data for a block of pixels to be encoded as a current block of a current picture of a video into a bitstream. The encoder determines (at block 1411) whether the block is coded by inter-prediction. If not, the process proceeds to block 1460. If so, the process determines (at block 1412) if the block is coded by TPM. If so, the process proceeds to block 1420. If not, the encoder encodes (at block 1495) the current block by using a prediction based on one motion candidate.

The encoder uses (at block 1420) a first merge index to select a first motion candidate and a second merge index to select a second motion candidate. The encoder computes (at block 1430) (i) a first prediction based on the first motion candidate for the current block and (ii) a second prediction based on the second motion candidate for the current block. In some embodiments, the current block is partitioned into the first and second units along a straight line at an angle bifurcating the current block for TPM mode. In some embodiments, the first prediction affects the first unit, the second prediction affects the second unit, and both the first and second predictions affect the overlap prediction region.

The encoder encodes (at block 1440) into the bitstream a first signaled index and a second signaled index that are determined from the first and second merge indices. In some embodiments, the second signaled index is determined based on a comparison between the first merge index and the second merge index. In some embodiments, the first signaled index is same as the first merge index but the second signaled index and the second merge index may be different. In some embodiments, the second signaled index is same as the second merge index but the first signaled index and the first merge index may be different. In some embodiments, the second merge index is computed as a sum or a difference of the first merge index and the second signaled index. In some embodiments, the second merge index is computed based on a sign bit that is signaled in the bitstream. In some embodiments, the second merge index is computed based on a sign bit that is inferred based on the first merge index.

The encoder encodes (at block 1450) the current block into a bitstream by using the computed first and second predictions.

The encoder generates (at block 1460) a set of prediction samples by intra prediction. For example, for ALWIP, by performing averaging, matrix vector multiplication, and/or linear interpolation based on pixels of the current block to generate a set of prediction samples of the current block, in other words, performing ALWIP prediction as described in Section IV above. In some embodiments, whether secondary transform and ALWIP are both performed is conditioned upon whether size, width, or height of the current block is greater or less than a threshold (e.g., before performing the secondary transform, the encoder determines that a size/width/height of the current block is greater than or equal to a first threshold and/or less than second threshold, or/and determines that an index of the secondary transform is larger than an index threshold.)

The encoder performs (at block 1470) a primary transform on a set of residual samples of the current block that are generated based on the set of prediction samples to generate a first set of transform coefficients.

The encoder performs (at block 1480) a secondary transform on the first set of transform coefficients to generate a second set of transform coefficients. In some embodiments, the encoder enables the primary transform by selecting a default candidate when a secondary transform is applied to the current block. The encoder then encodes the current block by performing transform operations on the received pixel data according to the enabled primary and secondary transforms to generate a set of transform coefficients.

In some embodiments, the default primary transform is discrete cosine transform type II (DCT-II). In some embodiments, the secondary transform is reduced secondary transform (RST) that maps an N dimensional vector to an R dimensional vector in a different space, wherein R is less than N. In some embodiments, the secondary transform is selected from four or less candidate secondary transforms. In some embodiments, the primary transform is selected from only one primary transform candidate (e.g. the default primary transform mode such as DCT-II for horizontal and vertical transform) when the secondary transform is enabled. In some embodiments, the index of the only primary transform candidate is less than three, e.g., zero. For example, when secondary transform is applied (e.g. the index for secondary transform is larger than 0), only one primary transform mode can be used and the index of primary transform is set to 0 which means the transform mode for primary transform is DCT-II.

The encoder encodes (at block 1490) the current block into the bitstream by using the generated sets of transform coefficients.

VIII. Example Video Decoder

Figure 15:
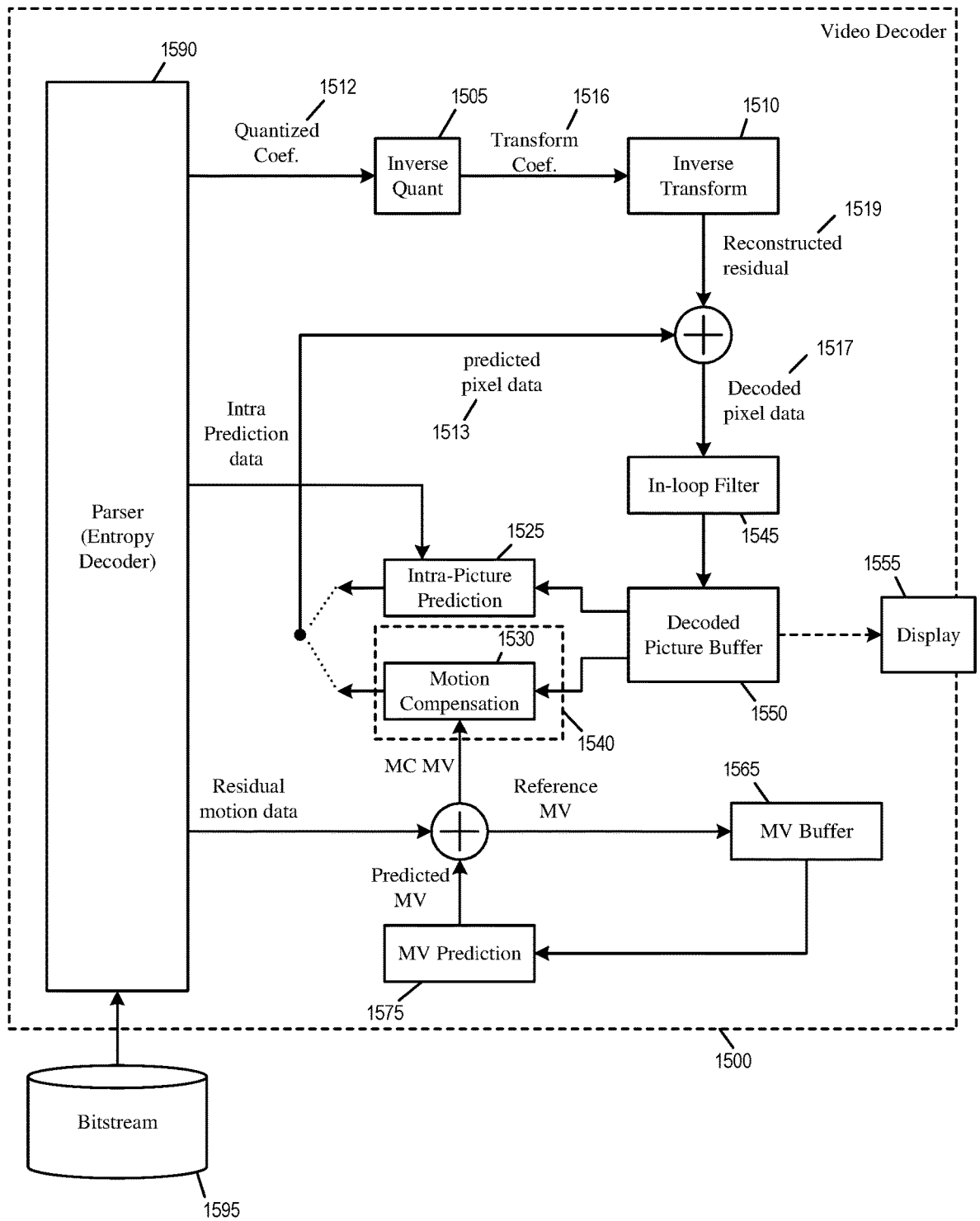
FIG. 15 illustrates an example video decoder 1500 that implements various primary transforms, secondary transforms, and/or prediction modes.

FIG. 15 illustrates an example video decoder 1500 that implements various primary transforms, secondary transforms, and prediction modes. As illustrated, the video decoder 1500 is an image-decoding or video-decoding circuit that receives a bitstream 1595 and decodes the content of the bitstream into pixel data of video frames for display. The video decoder 1500 has several components or modules for decoding the bitstream 1595, including some components selected from an inverse quantization module 1505, an inverse transform module 1510, an intra-prediction module 1525, a motion compensation module 1530, an in-loop filter 1545, a decoded picture buffer 1550, a MV buffer 1565, a MV prediction module 1575, and a parser 1590. The motion compensation module 1530 is part of an inter-prediction module 1540.

In some embodiments, the modules 1510-1590 are modules of software instructions being executed by one or more processing units (e.g., a processor) of a computing device. In some embodiments, the modules 1510-1590 are modules of hardware circuits implemented by one or more ICs of an electronic apparatus. Though the modules 1510-1590 are illustrated as being separate modules, some of the modules can be combined into a single module.

The parser 1590 (or entropy decoder) receives the bitstream 1595 and performs initial parsing according to the syntax defined by a video-coding or image-coding standard. The parsed syntax element includes various header elements, flags, as well as quantized data (or quantized coefficients) 1512. The parser 1590 parses out the various syntax elements by using entropy-coding techniques such as context-adaptive binary arithmetic coding (CABAC) or Huffman encoding.

The inverse quantization module 1505 de-quantizes the quantized data (or quantized coefficients) 1512 to obtain transform coefficients, and the inverse transform module 1510 performs inverse transform on the transform coefficients 1516 to produce reconstructed residual signal 1519. The reconstructed residual signal 1519 is added with predicted pixel data 1513 from the intra-prediction module 1525 or the motion compensation module 1530 to produce decoded pixel data 1517. The decoded pixels data are filtered by the in-loop filter 1545 and stored in the decoded picture buffer 1550. In some embodiments, the decoded picture buffer 1550 is a storage external to the video decoder 1500. In some embodiments, the decoded picture buffer 1550 is a storage internal to the video decoder 1500.

The intra-prediction module 1525 receives intra-prediction data from bitstream 1595 and according to which, produces the predicted pixel data 1513 from the decoded pixel data 1517 stored in the decoded picture buffer 1550. In some embodiments, the decoded pixel data 1517 is also stored in a line buffer (not illustrated) for intra-picture prediction and spatial MV prediction.

In some embodiments, the content of the decoded picture buffer 1550 is used for display. A display device 1555 either retrieves the content of the decoded picture buffer 1550 for display directly, or retrieves the content of the decoded picture buffer to a display buffer. In some embodiments, the display device receives pixel values from the decoded picture buffer 1550 through a pixel transport.

The motion compensation module 1530 produces predicted pixel data 1513 from the decoded pixel data 1517 stored in the decoded picture buffer 1550 according to motion compensation MVs (MC MVs). These motion compensation MVs are decoded by adding the residual motion data received from the bitstream 1595 with predicted MVs received from the MV prediction module 1575.

The MV prediction module 1575 generates the predicted MVs based on reference MVs that were generated for decoding previous video frames, e.g., the motion compensation MVs that were used to perform motion compensation. The MV prediction module 1575 retrieves the reference MVs of previous video frames from the MV buffer 1565. The video decoder 1500 stores the motion compensation MVs generated for decoding the current video frame in the MV buffer 1565 as reference MVs for producing predicted MVs.

The in-loop filter 1545 performs filtering or smoothing operations on the decoded pixel data 1517 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 16:
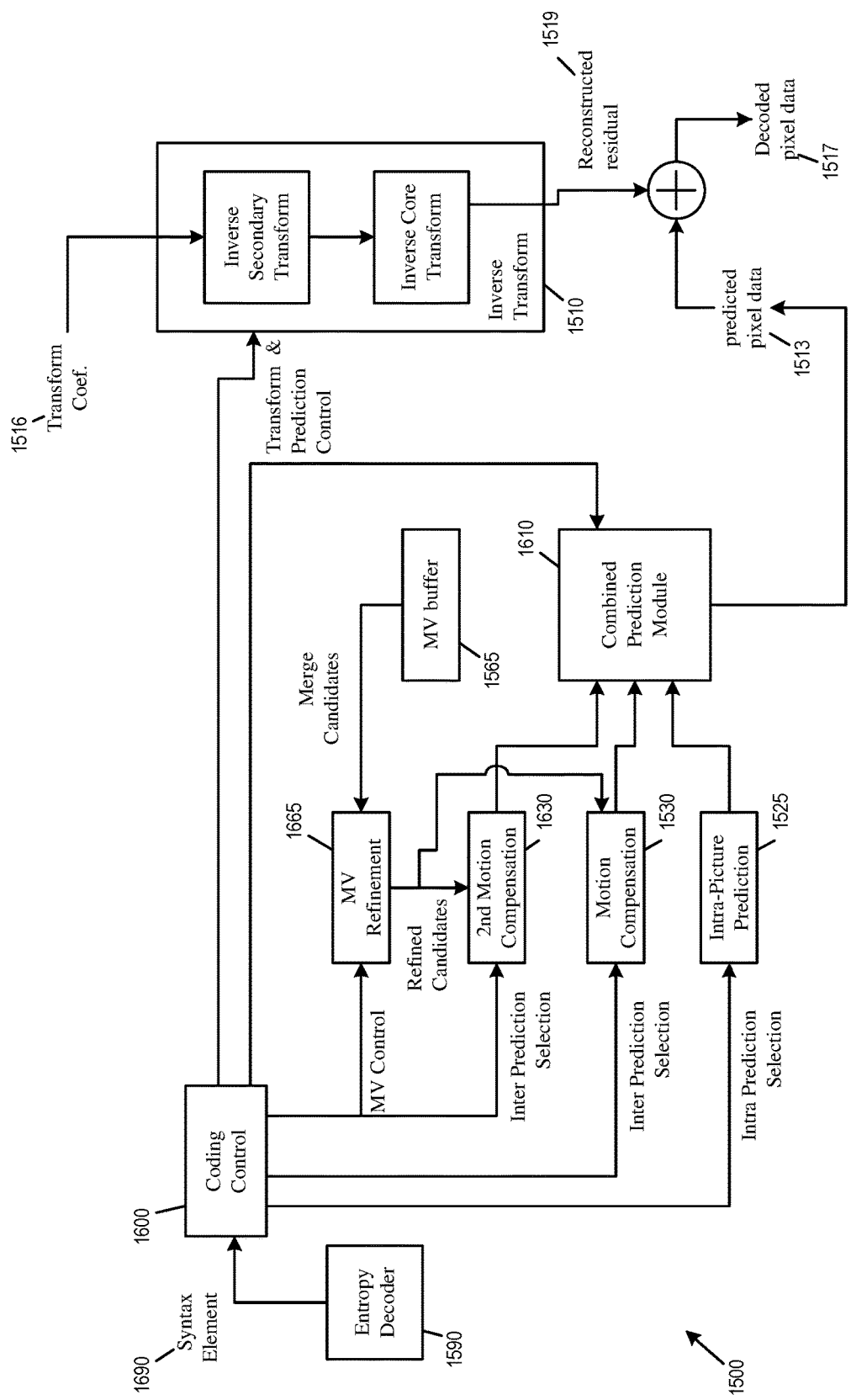
FIG. 16 illustrates portions of the decoder 1500 that enables and disables various primary transforms, secondary forms, and/or prediction modes.

FIG. 16 illustrates portions of the decoder 1500 that enables and disables various primary transforms, secondary transform, and/or prediction modes. Specifically, for each block of pixels, the decoder 1500 determines whether to perform a particular type of secondary transform (e.g., RST), whether to perform a particular type of primary transform (e.g., DCT-II), whether to perform a particular type of prediction (e.g. ALWIP, TPM, or CIIP), and how to determine which modes are enabled based on content of the bitstream 1595.

As illustrated, the inverse transform module 1510 performs inverse transform operations for primary transform and/or secondary transform (e.g., RST) on the transform coefficients 1516. The decoder 1500 selects a primary transform and/or a secondary transform for the transform module 1510 and the inverse transform module 1515. The video decoder 1500 also implements a combined prediction module 1610 that may receive intra-prediction values generated by the intra-picture prediction module 1525 or inter-prediction values from the motion compensation module 1530 or a second motion compensation module 1630. The combined prediction module 1610 in turn generates the predicted pixel data 1513.

The MV buffer 1565 provides the merge candidates to the motion compensation modules 1530 and/or 1630. The MV buffer 1565 also stores the motion information and the mode directions used to encode the current block for use by subsequent blocks. The merge candidates may be altered, expanded, and/or refined by a MV refinement module 1665.

The decoder 1500 includes a coding control module 1600. The coding control module 1600 controls the operation of the MV refinement module 1665. The coding control module 1600 also controls the transform and/or prediction operations of the decoder. For example, the coding control module 1600 determines whether to perform secondary transform and which type of secondary transform to perform (e.g., RST). For another example, the coding control module 1600 also determines which type of primary transform to perform (e.g., DCT-II). The coding control module 1600 controls the inverse transform operations (primary and/or secondary transforms) of the inverse transform module 1510.

The coding control module 1600 may enable the intra-prediction module 1525, the motion compensation module 1530, and/or the second motion compensation module 1630 to implement various prediction modes. Specifically, the coding control module 1600 may enable the motion compensation module 1530 and/or the second motion compensation module 1630 to implement TPM. The coding control module 1600 may enable the motion compensation module 1530 and/or the intra-prediction module 1525 to implement CIIP. The coding control module 1600 may also enable the combined prediction module 1610 to adopt different weighting schemes when combining prediction signals from intra-picture prediction module 1525, the motion compensation module 1530, and/or the second motion compensation module 1630, such as for the overlap prediction region 530 situated over the diagonal straight line boundary of TPM.

The coding control module 1600 may also be used to implement or define interactions between the various transform and prediction modes. For example, in some embodiments, the coding control module 1600 may enable both ALWIP operations and RST operations for coding the current block. The coding control module 1600 may further condition the enabling of both ALWIP and RST upon a size, width, or height of the current block (e.g., RST can be performed in an ALWIP block only if the block width and/or height is larger than or equal to a certain threshold size like 16.) As another example, the coding control module 1600 may select a default primary transform mode such as DCT-II for both horizontal and vertical transform whenever a secondary transform mode is enabled (e.g., having a non-zero index.) The coding control module 1600 may also be used to receive parameters or settings (e.g., merge index) from the bitstream 1595. For example, for a block that is coded by TPM mode, the coding control module 1600 may receive two signaled indices (Idx'1 and Idx'0) from the bitstream 1595 as syntax elements rather than the actual merge indices (Idx0 and Idx1) used to encode the two PUs of the current block.

Figure 17:
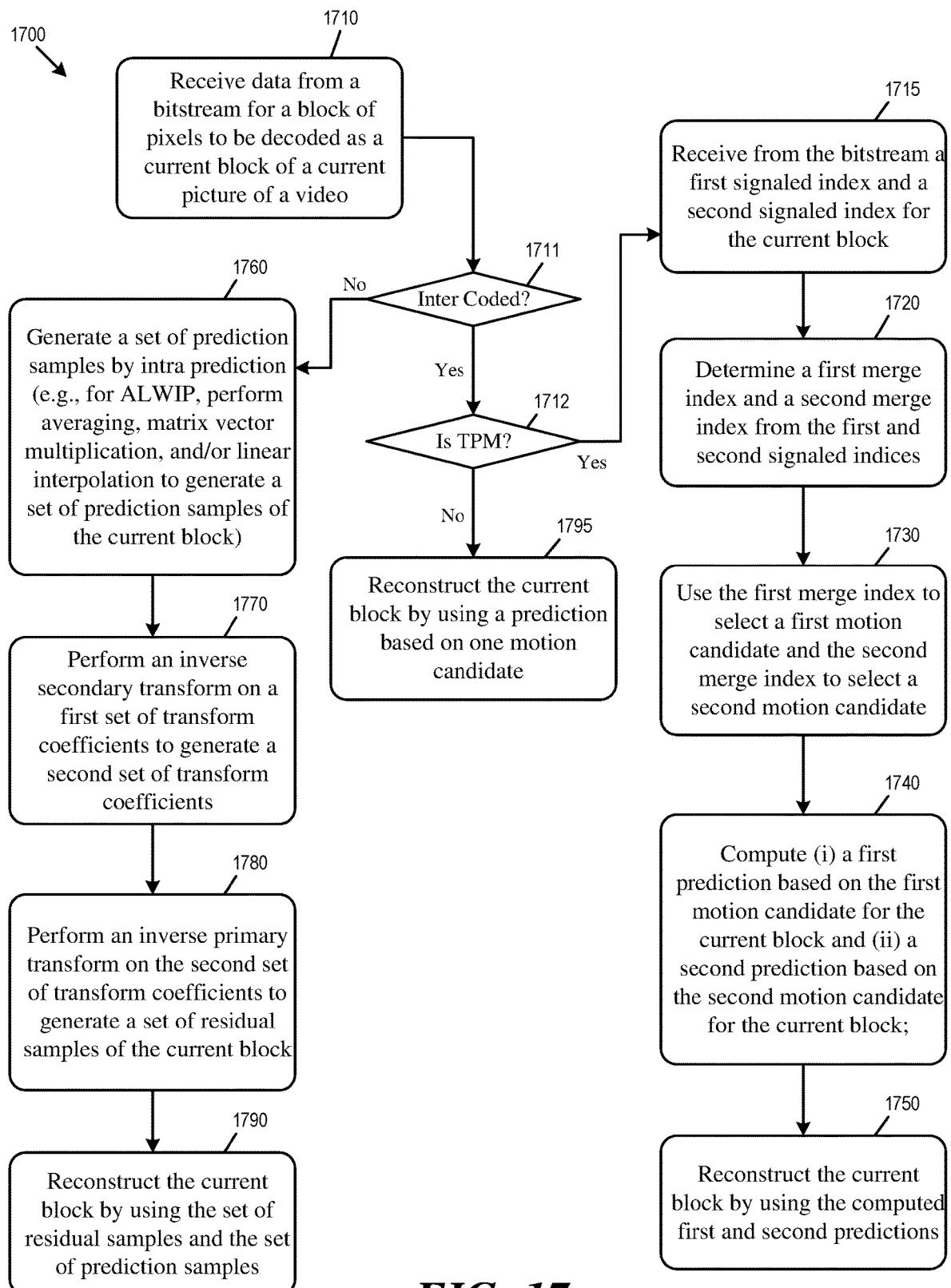
FIG. 17 conceptually illustrates a process 1700 for decoding a block of pixels by enabling certain primary transform, secondary transform, and/or prediction modes.

FIG. 17 conceptually illustrates a process 1700 for decoding a block of pixels by enabling certain primary transform, secondary transform, and/or prediction modes. In some embodiments, one or more processing units (e.g., a processor) of a computing device implementing the decoder 1500 performs the process 1700 by executing instructions stored in a computer readable medium. In some embodiments, an electronic apparatus implementing the decoder 1500 performs the process 1700.

The decoder receives (at block 1710) data from a bitstream for a block of pixels to be decoded as a current block of a current picture of a video. The decoder determines (at block 1711) whether the block is coded by inter-prediction. If no, the process proceeds to block 1760. If so, the process determines (at block 1712) if the block is coded by TPM. If so, the process proceeds to block 1715. If not, the decoder decodes (at block 1795) the current block by using a prediction based on one motion candidate.

The decoder receives (at block 1715) from the bitstream a first signaled index and a second signaled index for the current block. The decoder determines (at block 1720) a first merge index and a second merge index from the first and second signaled indices. In some embodiments, the second signaled index is determined based on a comparison between the first merge index and the second merge index. In some embodiments, the first signaled index is same as the first merge index but the second signaled index and the second merge index may be different. In some embodiments, the second signaled index is same as the second merge index but the first signaled index and the first merge index may be different. In some embodiments, the second merge index is computed as a sum or a difference of the first merge index and the second signaled index. In some embodiments, the second merge index is computed based on a sign bit that is signaled in the bitstream. In some embodiments, the second merge index is computed based on a sign bit that is inferred based on the first merge index.

The decoder uses (at block 1730) the first merge index to select a first motion candidate and the second merge index to select a second motion candidate. The decoder computes (at block 1740) (i) a first prediction based on the first motion candidate for the current block and (ii) a second prediction based on the second motion candidate for the current block. In some embodiments, the current block is partitioned into the first and second units along a straight line at an angle bifurcating the current block for TPM mode. In some embodiments, the first prediction affects the first unit, the second prediction affects the second unit, and both the first and second predictions affect the overlap prediction region.

The decoder reconstructs (at block 1750) the current block by using the computed first and second predictions.

The decoder generates (at block 1760) a set of prediction samples by intra prediction. For example, for ALWIP, by performing averaging, matrix vector multiplication, and/or linear interpolation based on pixels of the current block to generate a set of prediction samples of the current block, in other words, performing ALWIP prediction as described in Section IV above. In some embodiments, whether secondary transform and ALWIP are both performed is conditioned upon whether size, width, or height of the current block is greater or less than a threshold (e.g., before performing the secondary transform, the encoder determines that a size/width/height of the current block is greater than or equal to a first threshold and/or less than second threshold, or determines that an index of the secondary transform is larger than an index threshold.) In one embodiment with more detail, it is first decided whether width and height of the current block are greater than or equal to a first threshold. When the first deciding step is positive, constraint 1) is met and the index of the secondary transform is signaled. A following second deciding step is performed to see whether the signaled index is larger than the index threshold. If the second deciding step is positive, then constraint 2) is met. In some embodiments, it is required that more constraints should be met before the index of secondary transform can be signaled. However, these are examples under the spirit of the present application and should not limit the scope of the present application.

The decoder performs (at block 1770) an inverse secondary transform on a first set of transform coefficients to generate a second set of transform coefficients.

The decoder performs (at block 1780) an inverse primary transform on the second set of transform coefficients to generate a set of residual samples of the current block. In some embodiments, the decoder enables the primary transform by selecting a default candidate when a secondary transform is applied to the current block. The decoder then decodes the current block by performing inverse transform operations on the transform coefficients according to the enabled primary and secondary transforms to generate a set of residual samples.

In some embodiments, the default primary transform is discrete cosine transform type II (DCT-II). In some embodiments, the secondary transform is reduced secondary transform (RST) that maps an N dimensional vector to an R dimensional vector in a different space, wherein R is less than N. In some embodiments, the secondary transform is selected from four or less candidate secondary transforms. In some embodiments, the primary transform is selected from only one primary transform candidate (e.g. the default primary transform mode such as DCT-II for horizontal and vertical transform) when the secondary transform is enabled. In some embodiments, the index of the only primary transform candidate is less than three, e.g., zero. For example, when secondary transform is applied (e.g. the index for secondary transform is larger than 0), only one primary transform mode can be used and the index of primary transform is set to 0 which means the transform mode for primary transform is DCT-II.

The decoder reconstructs (at block 1790) the current block by using the set of residual samples and the set of prediction samples.

IX. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 18:
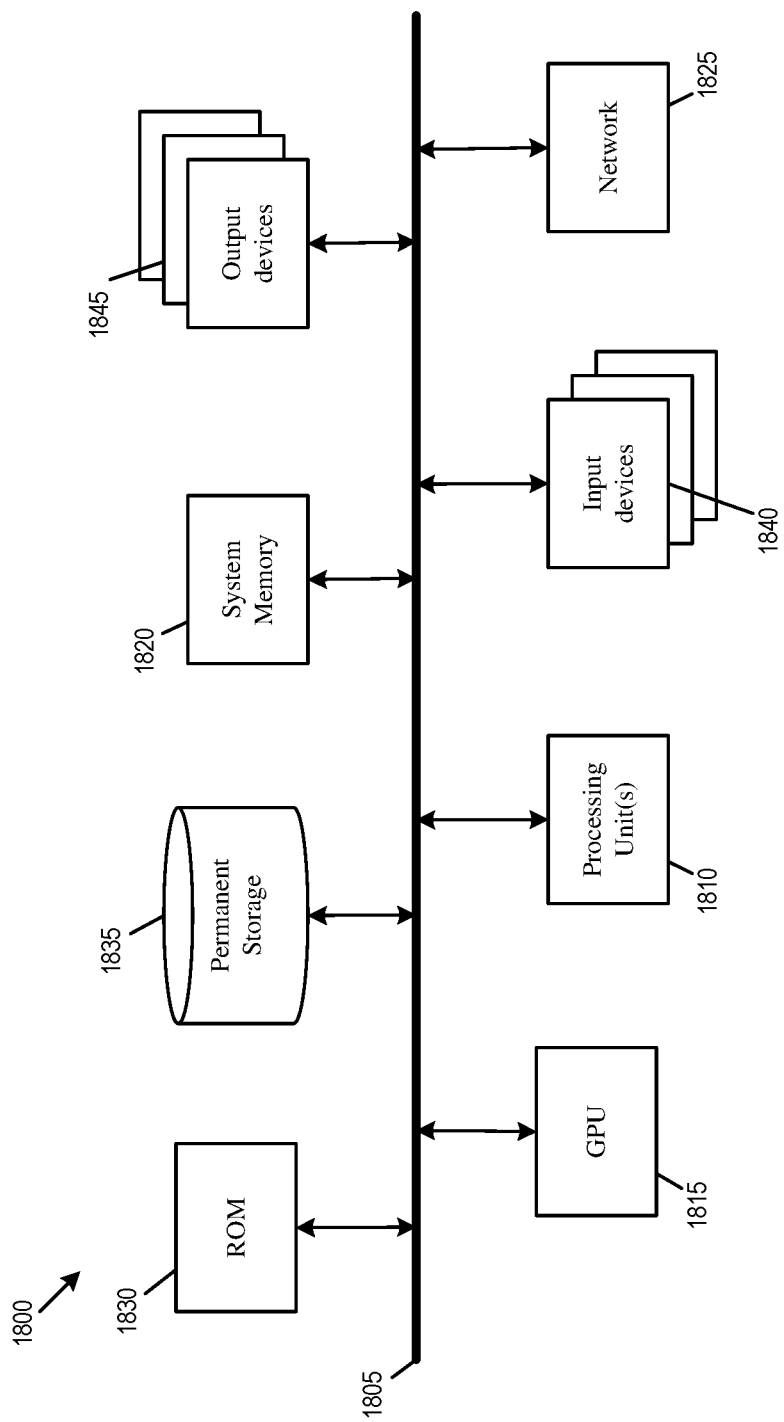
FIG. 18 conceptually illustrates an electronic system with which some embodiments of the present disclosure are implemented.

FIG. 18 conceptually illustrates an electronic system 1800 with which some embodiments of the present disclosure are implemented. The electronic system 1800 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1800 includes a bus 1805, processing unit(s) 1810, a graphics-processing unit (GPU) 1815, a system memory 1820, a network 1825, a read-only memory 1830, a permanent storage device 1835, input devices 1840, and output devices 1845.

The bus 1805 collectively represents all system, peripheral, and chipset buses that communicatively connect the numerous internal devices of the electronic system 1800. For instance, the bus 1805 communicatively connects the processing unit(s) 1810 with the GPU 1815, the read-only memory 1830, the system memory 1820, and the permanent storage device 1835.

From these various memory units, the processing unit(s) 1810 retrieves instructions to execute and data to process in order to execute the processes of the present disclosure. The processing unit(s) may be a single processor or a multi-core processor in different embodiments. Some instructions are passed to and executed by the GPU 1815. The GPU 1815 can offload various computations or complement the image processing provided by the processing unit(s) 1810.

The read-only-memory (ROM) 1830 stores static data and instructions that are used by the processing unit(s) 1810 and other modules of the electronic system. The permanent storage device 1835, on the other hand, is a read-and-write memory device. This device is a non-volatile memory unit that stores instructions and data even when the electronic system 1800 is off. Some embodiments of the present disclosure use a mass-storage device (such as a magnetic or optical disk and its corresponding disk drive) as the permanent storage device 1835.

Other embodiments use a removable storage device (such as a floppy disk, flash memory device, etc., and its corresponding disk drive) as the permanent storage device. Like the permanent storage device 1835, the system memory 1820 is a read-and-write memory device. However, unlike storage device 1835, the system memory 1820 is a volatile read-and-write memory, such a random access memory. The system memory 1820 stores some of the instructions and data that the processor uses at runtime. In some embodiments, processes in accordance with the present disclosure are stored in the system memory 1820, the permanent storage device 1835, and/or the read-only memory 1830. For example, the various memory units include instructions for processing multimedia clips in accordance with some embodiments. From these various memory units, the processing unit(s) 1810 retrieves instructions to execute and data to process in order to execute the processes of some embodiments.

The bus 1805 also connects to the input and output devices 1840 and 1845. The input devices 1840 enable the user to communicate information and select commands to the electronic system. The input devices 1840 include alphanumeric keyboards and pointing devices (also called "cursor control devices"), cameras (e.g., webcams), microphones or similar devices for receiving voice commands, etc. The output devices 1845 display images generated by the electronic system or otherwise output data. The output devices 1845 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 18, bus 1805 also couples electronic system 1800 to a network 1825 through a network adapter (not shown). In this manner, the computer can be a part of a network of computers (such as a local area network ("LAN"), a wide area network ("WAN"), or an Intranet, or a network of networks, such as the Internet. Any or all components of electronic system 1800 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIGS. 14 and 17) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video decoding method comprising:
   receiving data from a bitstream for a block of pixels to be decoded as a current block of a current picture of a video;
   receiving from the bitstream a first signaled index and a second signaled index for the current block;
   determining a first merge index and a second merge index from the first and second signaled indices;
   using the first merge index to select a first motion candidate and the second merge index to select a second motion candidate;
   computing (i) a first prediction based on the first motion candidate for the current block and (ii) a second prediction based on the second motion candidate for the current block;
   combining the computed first and second predictions to produce a combined prediction according to weighting factors each of which being derived based on a distance and an angle; and
   reconstructing the current block by using the combined prediction,
   wherein the second signaled index is equal to the second merge index minus one in an event that the second merge index is not less than the first merge index.

2. The method of claim 1, wherein the current block is partitioned into a first unit using the first prediction and a second unit using the second prediction along a straight line at an angle bifurcating the current block.

3. The method of claim 1, wherein the second signaled index is determined based on a comparison between the first merge index and the second merge index.

4. The method of claim 1, wherein the first signaled index is same as the first merge index.

5. The method of claim 1, wherein the second signaled index is same as the second merge index.

6. The method of claim 1, wherein the second merge index is computed as a sum or a difference of the first merge index and the second signaled index.

7. The method of claim 1, wherein the second merge index is computed based on a sign bit that is signaled in the bitstream.

8. The method of claim 1, wherein the second merge index is computed based on a sign bit that is inferred based on the first merge index.

9. An electronic apparatus comprising:
   an encoder circuit configured to perform operations comprising:
   receiving raw pixel data for a block of pixels to be encoded as a current block of a current picture of a video into a bitstream;
   generating a set of prediction samples of the current block by performing at least one of averaging, matrix vector multiplication, and linear interpolation based on pixels of the current block;
   performing a primary transform on a set of residual samples of the current block that are generated based on the set of prediction samples to generate a first set of transform coefficients;
   determining that a width and a height of the current block are greater than or equal to a first threshold;
   determining that an index of a secondary transform is larger than an index threshold;
   performing the secondary transform on the first set of transform coefficients to generate a second set of transform coefficients; and
   encoding the current block into the bitstream by using the generated second set of transform coefficients.

10. The electronic apparatus of claim 9, wherein before performing the secondary transform, the operations further comprises determining that the width or height of the current block are less than a second threshold.

11. The electronic apparatus of claim 9, wherein the secondary transform is reduced secondary transform (RST) that maps an N dimensional vector to an R dimensional vector in a different space, wherein R is less than N.

12. The electronic apparatus of claim 9, wherein the secondary transform is selected from four or less candidate secondary transforms.

13. The electronic apparatus of claim 9, wherein the set of prediction samples generated are for affine linear weighted intra prediction.

14. A video decoding method comprising:
   receiving data from a bitstream for a block of pixels to be decoded as a current block of a current picture of a video, the data comprising a secondary transform index that is indicative of a secondary transform applied to the current block;
   determining, based on the secondary transform index, whether to perform secondary inverse transform operations on the current block;
   selecting, response to a positive result in determining whether to perform the secondary inverse transform operations on the current block, a secondary transform mode based on the secondary transform index;
   determining, based on the secondary transform index, whether a primary transform index is parsed;
   determining, responsive to the positive result in determining whether to perform the secondary inverse transform operations on the current block, that the primary transform index is not parsed;
   applying, responsive to the determining that the primary transform index is not parsed, a default primary transform mode to the current block;
   decoding the current block by:
   performing the secondary inverse transform operations according to the secondary transform mode; and
   performing primary inverse transform operations according to the default primary transform mode following the performing of the secondary inverse transform operations.

15. The method of claim, 14, wherein an index of the default primary transform mode is zero.

16. The method of claim 14, wherein the default primary transform mode is discrete cosine transform type II (DCT-II).

17. A video encoding method comprising:
   receiving raw pixel data for a block of pixels to be encoded as a current block of a current picture of a video into a bitstream;

generating a set of prediction samples of the current block by performing at least one of averaging, matrix vector multiplication, and linear interpolation based on pixels of the current block;

performing a primary transform on a set of residual samples of the current block that are generated based on the set of prediction samples to generate a first set of transform coefficients;

determining that a width and a height of the current block are greater than or equal to a first threshold;

determining that an index of a secondary transform is larger than an index threshold;

performing the secondary transform on the first set of transform coefficients to generate a second set of transform coefficients; and encoding the current block into the bitstream by using the generated second set of transform coefficients.

18. An electronic apparatus comprising:
a video decoder circuit configured to perform operations comprising:
  receiving data from a bitstream for a block of pixels to be decoded as a current block of a current picture of a video, the data comprising a secondary transform index that is indicative of a secondary transform applied to the current block;
  determining, based on the secondary transform index, whether a primary transform is applied to the current block;
  enabling, responsive to the determining that the primary transform is applied to the current block, a primary transform by selecting a default primary transform mode or by parsing a primary transform index from the data, wherein primary transform index is indicative of the primary transform; and
  decoding the current block by performing a secondary inverse transform operations according to the secondary transform and, responsive to the determining that the primary transform is applied to the current block, a primary inverse transform operation according to the primary transform following the performing of the secondary inverse transform operation,
  wherein the default primary transform mode is inferred when the secondary transform is enabled.

19. The method of claim, 14, further comprising:
determining, responsive to a negative result in determining whether to perform the secondary inverse transform operations on the current block, that the primary transform index is parsed;

applying, responsive to determining that the primary transform index is parsed, an indicated primary transform mode to the current bock, wherein the indicated primary transform mode depends on the primary transform index;

decoding the current block by not performing the secondary inverse transform operations; and decoding the current block by performing the primary inverse transform operations according to the indicated primary transform mode.

* * * * *